(12) United States Patent
Mathews et al.

(10) Patent No.: US 10,371,806 B2
(45) Date of Patent: Aug. 6, 2019

(54) DOPPLER AIDED INERTIAL NAVIGATION

(71) Applicant: TELECOMMUNICATION SYSTEMS, INC., Annapolis, MD (US)

(72) Inventors: Michael B. Mathews, Kirkland, WA (US); Peter F. MacDoran, Woodinville, WA (US)

(73) Assignee: Telecommunications Systems, Inc., Annapolis, MD (US)

( * ) Notice: Subject to any disclaimer, the term of this patent is extended or adjusted under 35 U.S.C. 154(b) by 398 days.

(21) Appl. No.: 14/966,318

(22) Filed: Dec. 11, 2015

(65) Prior Publication Data

US 2016/0131751 A1    May 12, 2016

Related U.S. Application Data

(63) Continuation of application No. 13/269,426, filed on Oct. 7, 2011, now Pat. No. 9,239,376.

(60) Provisional application No. 61/391,517, filed on Oct. 8, 2010.

(51) Int. Cl.
*G01S 11/10* (2006.01)
*G01C 21/16* (2006.01)
*G01S 5/02* (2010.01)

(52) U.S. Cl.
CPC ............ *G01S 11/10* (2013.01); *G01C 21/165* (2013.01); *G01S 5/0263* (2013.01)

(58) Field of Classification Search
CPC ....... G01C 21/165; G01C 25/00; G01S 11/10; G01S 19/47; G01S 19/52; G01P 21/00
See application file for complete search history.

(56) References Cited

U.S. PATENT DOCUMENTS

| 5,347,285 A * | 9/1994 | MacDoran | G01S 19/52 342/352 |
|---|---|---|---|
| 5,928,309 A * | 7/1999 | Korver | G01C 21/165 342/359 |
| 6,061,021 A * | 5/2000 | Zibell | G01C 21/165 342/357.64 |
| 2003/0216865 A1* | 11/2003 | Riewe | G01C 21/165 701/470 |
| 2006/0125644 A1* | 6/2006 | Sharp | G01S 5/0263 340/573.1 |
| 2009/0265104 A1* | 10/2009 | Shroff | G01C 21/165 701/472 |

FOREIGN PATENT DOCUMENTS

WO    WO-0204977 A2 *   1/2002    .......... G01S 5/0036

OTHER PUBLICATIONS

P.S. Maybeck, Stochastic Models, Estimation, and Control, Academic Press, vol. 1, p. 1-16, 1979. (Year: 1979).*

\* cited by examiner

*Primary Examiner* — Bernarr E Gregory
*Assistant Examiner* — Fred H Mull
(74) *Attorney, Agent, or Firm* — Tarolli, Sundheim, Covell & Tummino LLP

(57) ABSTRACT

Doppler Aided Inertial Navigation (DAIN) facilitates the determination of position, velocity and direction of mobile devices operating in highly obstructed GPS/GNSS environments. Delivering high precision, high resolution positioning information using signals of opportunity, the present invention measures the Doppler shift of a moving device using a variety of signals combined with inertial accelerometers and environmental sensors to deliver an autonomous positioning and navigation capability that does not require external infrastructure or a priori knowledge of signal sources.

17 Claims, 25 Drawing Sheets

| SEG | BEARING DEGREES | DISTANCE METERS | DURATION sec | START sec | END sec | AVG. SPEED m/sec |
|---|---|---|---|---|---|---|
| (A) | -- | -- | 14 | 1 | 14 | (0) |
| A ->B | 270 | 18 | 17 | 14 | 31 | 1.06 |
| (B) | -- | -- | 10 | 31 | 41 | 0 |
| B ->C | 0 | 11 | 11 | 41 | 52 | 1.00 |
| (C) | -- | -- | 10 | 52 | 62 | 0 |
| C ->D | 90 | 18 | 16 | 62 | 78 | 1.12 |
| (D) | -- | -- | 10 | 78 | 88 | 0 |
| D ->A | 180 | 11 | 11 | 88 | 99 | 1.00 |
| (A) | -- | -- | 14 | 99 | 114 | 0 |

FIG.7B

| SIGNAL | FREQUENCY MHz | AZIMUTH DEGREES | RANGE METERS |
|---|---|---|---|
| GSM 1 | 1936 | 196 | 945 |
| GSM 2 | 869 | 213 | 2830 |

FIG.7C

DOPPLER AIDED INERTIAL NAVIGATION

RELATED APPLICATIONS

This application is a continuation application of U.S. patent application Ser. No. 13/269,426, filed 7 Oct. 2011, which claims priority to U.S. Provisional Application No. 61/391,517, filed 8 Oct. 2010, which application is hereby incorporated by reference in its entirety as if fully set forth herein.

FIELD OF THE INVENTION

The invention relates to a system and method for providing precise, autonomous positioning information for navigating indoors or in GPS/GNSS obstructed environments. The invention combines high precision RF Doppler observations of readily available, existing signals with inertial and environmental sensor data to provide an autonomous positioning and navigation solution. The solution is a cost-effective approach well suited for consumer mobile wireless devices, for example, smart phones.

BACKGROUND OF THE INVENTION

Doppler and inertial navigation technologies have been in use in various forms since at least the 1950s when critical advances in inertial measurement and Doppler radar were achieved. These were applied successfully in aircraft navigation systems combining inertial measurement units (IMU) with onboard radar that enabled calibration of inertial drift based on observed ground speed. These systems were collectively known as Doppler-Inertial Navigation Data Systems and are well taught in technical literature including U.S. Pat. No. 2,914,763 (Greenwood and Berger, 1959) and U.S. Pat. No. 3,028,592 (Par, et. al., 1962).

The basic principle behind these systems is to combine the inherent long-term measurement accuracy of the Doppler velocity in concert with the short term precision and resolution provided by inertial systems. Inertial systems can produce high resolution, and relative high precision observables at high data rates, but will tend to drift in terms of accuracy over long intervals. Doppler observables in contrast have lesser resolution and precision at slower data rates but do not suffer drift over long intervals. Using a filter (a servo controller in those days), these observables were combined to produce a corrected velocity data that provided high data rates with high resolution and minimal drift over long intervals. Doppler velocity observables were based upon reflection of radar signals from a nominally static, earth-fixed surface. To make these systems function required both a radio frequency transmitter and receiver aboard the vehicle. These systems were used in aircraft navigation until supplanted by more advanced positioning and navigation technologies such as LORAN and GPS, which had the benefit of requiring only a radio frequency receiver—a receive-only architecture.

Similar Doppler-Inertial techniques were applied using acoustics for the autonomous navigation of an underwater vehicle. In this configuration the acoustic transceivers (e.g. sonar) provided Doppler velocity estimation that further constrained the IMU, accomplishing the same effect as the aircraft-based Doppler-Inertial Navigation Data Systems. This technique is described and taught in various technical references including the work published by Hegrenæs, and Berglund (2009).

The advent of Global Navigation Satellite Systems (GNSS), including the U.S. Global Positioning System (GPS), advanced the techniques of hybrid inertial navigation, where precise GPS ranging and Doppler observables were used to provide continual calibration of IMU data enabling a navigation solution that could simultaneously provide high update rate (in some cases in the kilohertz) while maintaining high accuracy over long periods of times. These systems also addressed some of the weaknesses in radio navigation systems providing data even during intermittent outages due to obstructions (e.g., during aircraft maneuvers). These GNSS-Inertial Navigation Systems (GNSS/INS) hybrids have been used extensively in military, space, and commercial guidance and navigation applications. The principles of both loosely-coupled and tightly-coupled GNSS/INS systems have been well taught and covered in research papers and patents for example U.S. Pat. No. 5,416,712 (Geier, et. al., 1995) and U.S. Pat. No. 6,900,760 (Groves, 2005).

Loosely-coupled GNSS/INS is similar to the original Doppler-Inertial Navigation Data Systems where the processed ranging observables and inertial observations are combined by a filter maximizing data rate, precision, and long-term accuracy. These systems perform well during short term outages of GNSS and in situations where the device is undergoing only moderate dynamics. These systems are commonly used in vehicle land navigation, marine navigation, and general and commercial aircraft systems.

A GNSS receiver (e.g. a GPS receiver) produces position and velocity information after acquiring signals from at least four or more satellites as well as a valid set of precision orbit elements of the satellites. If the vertical height is known a priori or constrained, a minimum of three satellites are required to produce position and velocity estimates. An IMU produces acceleration observables (linear and rotational). Both sets of observables are typically used to update an Extended Kalman Filter (EKF), which produces the fused set of observations comprising near real-time acceleration, velocity, and position in three dimensions.

Tightly-coupled GNSS/INS is significantly more complicated than the loosely-coupled approach in that IMU data is integrated into the RF signal processor tracking loops used to track the GNSS satellites. In applications with very high dynamics (e.g. metric launch or missile navigation), tightly-coupled GNSS/INS makes it possible for the navigation system to operate. The IMU observables provide the means to do active rate aiding of the tracking loops so that the tracking loop can maintain lock when the frequency rate of change is greater than the tracking filter bandwidth.

For land, sea, and air vehicles, these combined Doppler/inertial techniques, whether using GNSS, radar, or acoustic transponders combined with IMU, have proven effective in creating robust and highly accurate navigation information. Yet when considering modern mobile computing devices including smart phones, tablets, and tracking devices that must operate in highly complex, often GNSS obstructed environments; direct application of these techniques has limited feasibility.

Mobile device autonomous positioning and navigation in indoor environments using combined Doppler-inertial techniques must deal with the challenges of multipath contamination, Rayleigh fading, and potential RF/acoustic interference from other active emitting devices. Current Doppler-inertial techniques as taught by the previous art are insufficient given the impracticality of using device-based active RF or acoustic emitters, which would decrease battery life, increase ambient RF noise and be susceptible to interference from other devices in the vicinity. While possible to deploy purpose-built infrastructure to support current Doppler-inertial techniques it inherently weakens the advantages since it is antithetic to the concept of autonomy.

Work by others to combine MEMS inertial technology, Assisted GPS (AGPS) technology, and/or WLAN positioning techniques has demonstrated some success, but has yet to achieve the performance needed to provide reliable and accurate positioning and navigation data over long intervals of distance and time. Work exemplified by Lachapelle (2004), Seitz et. al. (2007), and Renaudin et. al. (2007) teach various methods and techniques for combining these systems to provide pedestrian navigation in GNSS obstructed environments.

One successful approach to indoor pedestrian navigation was demonstrated by Foxlin (2005), where a shoe mounted MEMS IMU was capable of producing accurate navigation over long intervals using a technique of zero velocity update (ZUPT) to correct the inherent drift in the IMU. Jimenez (2010) further developed these techniques to improve performance combined with GPS data as well. These techniques rely on the frequent correction provided by the ZUPT performed at each step when the pedestrian foot touches the ground and is momentarily without motion. The interest in this technique continues as it has been shown to provide very high performance even in the most complex environments. Yet it has one significant drawback, it requires the placement of the IMU sensor on the foot in order to achieve the most reliable and effective ZUPT correction. When applied to an IMU sensor in a mobile device such as a smart phone, the additional degrees of freedom due to the device being held in the hand results in the ZUPT correction being much less effective since the motion of the hand can obscure the actual step. In an attempt to correct for this condition, the use of map matching has been tried with some limited success.

Accordingly, for navigation using mobile devices in heavily GNSS obstructed environments, there is a need for a better solution to produce autonomous positioning and velocity information that can take advantage of the high resolution and precision of MEMS IMU sensors while maintaining long-term accuracy. The use of Doppler aiding for inertial navigation in these mobile devices is a natural adaptation of the previous embodiments. However, the methods and systems used previously to provide these capabilities are impractical for mobile devices in complex multipath environments. Novel methods and systems are required in order to meet the challenges of the complex operating environments and device constraints: methods and systems that can exploit readily available signals in a complex multipath environment with minimal impact on the devices size, weight, and power requirements. Such is the nature of the present invention.

Summary of Terms

"3G" means Third Generation cellular communications—a communication mode utilizing Code Division Multiple Access (CDMA) modulation to serve high mobility users with data rates up to 200 kilobits per second.

"4G" means Fourth Generation cellular communications—a communication mode utilizing Orthogonal Frequency Division Multiple Access (OFDMA) modulation to better serve high mobility users with data rates up to 100 megabits per second.

"Accelerometer" means a device to sense changes in position induced by linear forces applied to a known mass resulting in a linear acceleration.

"Adaptive Filtering" means an algorithmic approach whose parameters are altered in such a manner as to better accommodate the dynamics encountered by the DAIN (e.g., stride length step calibration, step-counting, based upon derived Doppler speed, horizontal oriented accelerometers and the vertical acceleration sensing of step-induced transients).

"A-GPS" means Assisted-GPS wherein a local GPS reference station provides the parameters for a nearby GPS receiver to reduce the acquisition time of the GPS receiver by providing almanac, ephemeris, GPS time, approximate position and all relevant individual satellite Doppler conditions to assist the GPS cross correlation processing and to provide a full differential GPS solution.

"Autonomous positioning and navigation" means a configuration of a mobile device which possesses sufficient sensors and device-resident information so as to be capable of providing the device positioning and navigation information without external network participation.

"Baseband" means a bandwidth of sufficient width to capture signals of interest but contained in a frequency band that is near zero Hertz although such signals originated in a spectral region considerably higher in frequency (e.g., original signal: 1.9 GHz+/−3.84 MHz; baseband: 0 to 4 MHz).

"Blue Force" means friendly combatants and particularly the tracking of such combatants. By contrast, enemy combatants are referred to as team the Red Team.

"BPSK" means Bi-Phase Shift Keying—a modulation method involving two possible states (0° and 180°) of phase shifting used to encode digital information.

"Cascaded delay and multiply" means a configuration utilizing two or more sequential delay and multiply operations on a given baseband RF signal so as to give rise to a narrowband data type. This cascaded approach is useful for processing polyphase signals such as QPSK, where each stage of the cascade reduces the number of possible phase states by a factor of two. For example, a QPSK signal and has four possible phase states. In a two-stage cascaded delay and multiply operation the QPSK signal is transformed into a BPSK signal with only two possible phase states.

"CDMA" means Code Division Multiple Access, a method of orthogonal digital sequence modulation for simultaneous multiple channels using the same RF spectral region. Of particular interest are those signals created by direct sequence pseudo random digital sequence generators using shift register feedback modes. The rate at which the digital sequence is generated is determined by the code chipping rate.

"Chipping Frequency" means the rate at which tapped shift registers are fed back to the input of the first stage of the shift register. For example, the chipping rate for the C/A channel of the GPS is a frequency of 1.023 MHz.

"Coherent Down Conversion" means the translation of an intercepted signal at some nominal center frequency to baseband or some intermediate frequency, where the translation is implemented such that the method of translation frequencies are coherently derived from a common system oscillator that also is used to derive the digital sampling clock for analog to digital conversion (ADC) of the translated signal.

"Cross correlation" means a signal detection method using a receiver residence code replica to that of the transmitter spreading code in order to de-spread the signal and extract the digital messaging input at the transmitter.

"Doppler Aided Inertial Navigation", DAIN, means the methods and systems that exploit pre-existing RF signals in order to derive a Doppler frequency measurement that yields a direct observation of the speed that can be used in combination with inertial accelerometer data providing autonomous positioning and navigation in complex environment.

"Doppler Peak Broadening" means a phenomenon produced by a Doppler sensor when physically moving within a complex multipath reflective RF environment such as within a modern building although the phenomenon also exists in outdoor environments, where the Doppler broadening effects are useful for inertial sensor calibration.

"Doppler Pre-Processor" means a processor which ingests information available about the intercepted RF signal (e.g., wavelength, type of modulation and signal direction vector, if known) in order to convert Doppler observations to speed and direction of motion, measurement uncertainty, degree of multipath encountered and estimates the precision of the signal direction vector.

"Doppler Shift" means the modification of a received frequency relative to the original frequency from an emitter because of relative motion between the emitter and the receiver. Such alterations may include a spreading of the detected Doppler shift spectral line signal which is spread in frequency space, particularly when the intervening propagation conditions between emitter and receiver involves propagation through a multipath-rich environment.

"DSP" means Digital Signal Processing, using a digital stream representing an original analog signal to perform filtering, effective frequency conversions, extractions of intrinsic signals and the many functions previously implemented in static architectures not amenable to rapid alterations.

"DTV" means Digital TeleVision, specifically the Advanced Television Systems Committee (ATSC) standard utilizing offset frequency division multiple access (OFDMA) with an imbedded suppressed carrier of 2.69 MHz. DTV transmitter sites often utilize effective radiated power of approximately one million Watts in the UHF spectral region of approximately 600 MHz.

"Effective Process Gain"—in the matter of SCP, the compression ratio of the original intercepted RF signal bandwidth to the bandwidth of the detected Doppler shift signal of interest achieved by codeless processing means (see also Process Gain).

"ENU" means East North Up, a positioning device specific local coordinate frame of reference established by means of accelerometers and magnetic compass resident within the device.

"Environmental sensors" means devices sensing physical characteristics of the current environment. These sensors include magnetic compass for determining magnetic north and barometric pressure (for determining relative height changes).

For example, the Environmental sensors sense vertical orientation and provide information pertaining to current orientation and physical displacement.

"FFT" means Fast Fourier Transform, a mathematical technique used to derive amplitude, frequency and phase from a time series of digital samples, in particular to extract Doppler frequency shift observables.

"GNSS" means Global Navigation Satellite System, a term intended to include all of the multinational navigation satellite constellations including the Russian GLONASS, the European Union Galileo, the Chinese Compass (Beidou) and the Japanese QZSS and the U.S. GPS. To date, the GPS is the only fully operational satellite navigation system.

"GPS/GNSS Obstructed environment" means an environment in which the RF signals from the satellites of the GPS or other constellations of the GNSS are not available because of signal absorption or signal blockage because of buildings that will obstruct signal availability with sufficient signal strength from three or more satellites arriving from different directions.

"GPS" means Global Positioning System, a constellation of 31 satellites operated by the U.S. Air Force which provides three-dimensional positioning and navigation in addition to precision timing. The signal power available from the GPS satellites performs well in outdoor environments and with some effectiveness in signal attenuated conditions but GPS signals are essentially without utility for precision positioning in indoor environments.

"GSM" means Global System for Mobile communications, a second generation, 2G, digital cellular network using Gaussian Minimum-Shift Keying (GMSK) modulation with a channel bandwidth of approximately 270 kHz.

"Gyroscope" means a device to sense changes in orientation induced by rotation applied to a known mass giving rise to rotational acceleration.

"Hanning windowing" means an algorithmic process in FFT processing in order to reduce transient signal effects caused by the transformation of continuous signals using non-continuous transform methods. An artifact of approximately 3 Hz occurs in the detection of spectral lines using the methods of Hanning windowing.

"IMU" means Inertial Measurement Unit, typically composed of three accelerometers and three gyroscopes configured in an orthogonal array to sense six degrees-of-freedom. These environmental sensors are typically fixed within the device or body such that they measure linear or rotational acceleration occurring orthogonally in one, two or three dimensions.

"Inertial Sensors" means multiple linear and rotational accelerometers representing one or more inertial axes in order to measure the translational and rotational changes in one, two or three dimensions experienced by a device or object. Although such inertial sensors possess high sensitivity and rapid update rates, these inertial sensors have inherent random acceleration drift characteristics such that when doubly integrated to produce position result in very significant positioning errors. The present invention provides a method and system whereby RF signals, from many potential sources, can be exploited to provide Doppler speed determination that calibrates and thus removes the accelerometer drifts.

"Kalman filtering" means an algorithmic estimation process to produce position, speed and direction using a procedure for estimating the uncertainty of predicted values and computing a weighted average of the predicted value. The filtering method proceeds by assigning the most weight to the values with the least uncertainty. The estimates produced by the method tend to be closer to the true values than ordinary measurements because the weighted average has a better estimated uncertainty.

"Low Probability of Detection," LPD, means RF emissions structured in such a manner that it would be improbable for an unintended recipient to be able to detect the existence of such the signal. Implementations of LPD signals are often done by digital codes that spread the spectrum of a RF carrier that contains the message modulation so as to achieve a sub-thermal status to avoid detection.

"Low Probability of Intercept," LPI, means RF communications structured in such a manner that it would be improbable that an unintended recipient would be able to derive intelligence of the signal such the signal be detected.

"Map Cache" means the storage of current map information for the venue in which the device is operated in order to verify the current path traversed.

"Map Matching" means algorithms to correlate physical state estimates with physical constraints imposed by the local environment. The physical state estimates are analyzed relative to the current map information stored in the map cache to verify or determine the current path traversed. A maximum likelihood estimator is used to compare the physical state estimates with physical corridors and passageways within a structure to verify that the indicated device position does not pass through walls.

"Multipath" means an RF signal propagation environment occurring when the path between the emitter and the receiver involves RF signal reflectors (metal objects larger than an RF wavelength) such that the resultant received signal will not have traveled a rectilinear path from emitter to receiver. Of particular interest is the situation of modern urban buildings where many such metallic reflective objects exist such as structural steel supports, air conditioning sheet metal duct-work and vapor deposited metallic window coatings. A highly complex multipath propagation situation exists in such conditions which prevents typical RF positioning methods because the spatial separation between emitter and a receiver cannot be accurately measured. However, it is this indoor multipath complexity that gives rise to Doppler broadening that allows DAIN to determine the speed of a smart phone in order to constrain the drift of inertial sensors.

"Narrow Band Signal Detector" means the extraction of one or more Doppler frequency observables from the intercepted signals into a bandwidth considerably narrower (e.g., one part per billion) than the intercepted RF carrier signal. Narrowband signal detection enables high precision Doppler measurements because of the high level of effective process gain.

"Non-Linear operations" means the processes by which spectral compression is achieved by using nonlinear means of signal squaring, delay and multiply, bandwidth synthesis, differentiation and decimation will produce one or more narrow spectral responses that will provide useful Doppler shift observations. For a suppressed carrier recovery, squaring or delay and multiply are typically the preferred operations.

"Physical State Estimator," PSE means a linear estimator which updates the current state using least squares error minimization or maximum likelihood estimation techniques in order to derive the physical quantities of position, velocity and acceleration of the device of interest.

"Physical state" means the physical characteristics relative to a reference frame of a device comprised of at least one or more of the following: position, attitude, clock and temporal derivatives. Position and attitude may be in one, two, or three dimensions. Position is a measurement of linear distance along one or more axes. Attitude is a measurement of angular rotation about some axis. Clock is the measurement of time. Temporal derivatives are the time derivatives of primary physical characteristics.

"Point of Beginning," POB, means a physical location of initialization/departure for the DAIN methodology of displacement positioning away from the POB. The POB can a known fiducial point with WGS-84 coordinates or a localization signal such as from a Wi-Fi access point in a building that can be associated with a specific location on the device resident digital map.

"ppb" means Parts Per Billion, characterization of very small quantity particularly in terms of stability of a reference frequency oscillator, for example, if related to a clock, 1 ppb will result in an error of 0.1 millisecond in one day or a frequency error of 1 milliHertz at a 1 MHz frequency center.

Positioning Sensor means a device that can determine the absolute position and position uncertainty of a device in a fixed reference frame such as WGS-84. Examples of positioning sensors include but are not limited to a GPS receiver; Cellular/Wi-Fi network positioning determination systems (e.g. Skyhook) using Trilateration or Received Signal Strength Indication (RSSI); landmark sensing using Radio Frequency Identification (RFID) or Near Field Communication (NFC) tags; infrared tags; or digital image recognition of physical landmarks and 2-D bar codes (e.g. Quick Response (QR) codes).

"ppm" means Parts Per Million, characterization of small amount particularly in terms of stability of a reference frequency oscillator, for example, if related to a clock, 1 ppm will result in an error of 0.1 second in one day or a frequency error of 1 Hz at a 1 MHz frequency center.

"Process Gain" means the ratio of the original RF signal bandwidth to the post detection bandwidth, expressed in dB, the degree to which a wideband signal has been compressed into a narrowband signal containing the data of interest.

"QPSK" means Quadrature Phase Shift Keying, a modulation method involving four possible signal phase shift states (0.degree., 90.degree., 180.degree. and 270.degree.) used to encode digital information transmission.

"Random Walk Noise" means a mathematical technique in simulations which approximates noise effects that occur in actual operations. At each sample, the noise generator proceeds with an assumption that the noise increment may increase or decrease in magnitude with equal likelihood.

"Received Signal Strength Indication" or "RSSI" is method of positioning of a mobile wireless device based upon of the simultaneous reception of multiple Wi-Fi access points or other signals, where the received signal strength "fingerprint" pattern indicates an approximate location as established by a previous survey of the venue.

"RF Doppler Receiver" means a receiver capable of intercepting RF signals in a manner suitably configured for the extracting of Doppler observables.

"Signals of Opportunity" means RF signals which are pre-existing in the environment without the necessity to incur the costs and complications intrinsic to the licensing of RF spectra and deployment of specialized transmitters. In some cases these RF signals may have been deployed with the explicit intent to support navigation such as the GNSS constellations or deployed for commercial broadcasting (e.g., digital television) or common carrier communications (digital telecommunications, e.g., cell phone towers).

"Software Defined Radio," SDR means, a communications receiver/transmitter architecture which performs complex signal handling in the digital domain by means of an analog to digital converter (ADC) followed by digital signal processing (DSP) methodologies suitable for rapid reconfiguration, as needed.

"Spectral Compression Positioning", or SCP, means a method whereby one or more nonlinear operators are used to extract changing physical characteristics in the form of amplitude, frequency and phase and temporal derivatives of the intercepted signal without regard to the preservation of information content modulated within the intercepted signals. The process of extraction utilizes at least one or more unknown physical characteristics of the intercepted signal to distill wideband spectral content into a narrowband regime, which preserves the physical characteristics including the Doppler frequency shift. The distillation of wideband spectral content can be performed without regard to modulated information content enabling effective process gain that yields high signal to noise ratios for the extracted physical characteristics. The specific methods and techniques for implementing spectral compression are documented in U.S. Pat. No. 7,511,662.

"Sub-thermal" means communications occurring in conditions in which the signal power spectral density is below the receiver self-generated thermal noise.

"TCXO" means Temperature Compensated Crystal Oscillator, a frequency reference device often used in mobile communication devices typically with an accuracy of 1 ppm.

"W-CDMA" means Wideband Code Division Multiple Access—the 3G mode of cellular telephony utilizing a bandwidth of 3.84 MHz.

"WGS-84" means World Geodetic System-1984, an Earth-centered Earth-fixed coordinate system which is the frame of reference for all modern surveying and mapping particularly when involving satellite-based positioning and navigations systems.

"Wi-Fi" means Wireless Fidelity now a worldwide branded-standard for short range wireless digital communications using the IEEE 802.11 family of interoperability standards, typically operated in RF spectral regions of 2.4 GHz and 5 GHz.

"ZUPT" means Zero Velocity Update an operational procedure employed with inertial measurement equipment to present a zero velocity condition to calibrate intrinsic drift of accelerometers.

SUMMARY OF THE INVENTION

Providing precise, cost-effective, and autonomous positioning information for navigating indoors or in GPS obstructed environments is a technical challenge that remains largely unsolved in consumer applications. Advances in hybrid Wi-Fi/A-GPS positioning and inertial technologies, are showing potential, but have yet to deliver meter level accuracy without requiring deployment of support infrastructure. Better solutions are needed to position mobile devices including smart phones and digital cameras with 1 to 3 m (better than room level quality) accuracy both indoors and outdoors.

The present invention, Doppler Aided Inertial Navigation (DAIN), facilitates the determination of position, velocity, and direction of human worn mobile devices operating in highly obstructed GPS/GNSS environments. Delivering high precision, high resolution positioning information using signals of opportunity, the present invention measures the Doppler shift of a moving device using a variety of signals including cellular, DTV, and local wireless combined with inertial accelerometers and environmental sensors (magnetic, barometric, etc.). The preferred embodiment of the present invention delivers an autonomous positioning and navigation capability that does not require external infrastructure or a priori knowledge of the RF signal sources.

The resulting alternative embodiments of the present invention overcome the disadvantages associated with current systems and methods and provide a cost efficient, simply implemented and rapidly deployable system and method for positioning and navigation by remote users operating in environments where GNSS (e.g. GPS) signals are not available.

There are a number of advantages to the various embodiments of the present invention. For example, the very substantial cost-avoidance of deployment associated with a purpose built infrastructure for indoor positioning and particularly the complexities of radio spectrum licensing and potential for interference to or from other RF systems. In addition, in situations where a signal of opportunity system may not be pre-existing, for example, in a Blue Force tracking/hostage rescue team would be using LPI/LPD communications. That same communications capability could simultaneously serve as an RF source for the DAIN system that would be tracking the Blue Force individuals even through the communications would be normally sub-thermal and undetectable. Another exemplary advantage to the various embodiments of the present invention is the avoidance of complicated inertial sensor calibration techniques such as the Zero Velocity Update (ZUPT), which is commonly used to limit the drift of accelerometers and gyroscopes. The RF Doppler observables effectively provide continuous calibration of inertial sensor observables eliminating the need to periodically stop all motion so that systematic inertial acceleration biases can be removed.

Yet another exemplary advantage of the present invention is the capability using Spectral Compression Positioning (SCP) signal processing techniques to exploit multiple signals of opportunity. An SCP sensor can produce precise RF Doppler observables for virtually any RF communications signal, maximizing performance and reliability across a large number of environments, where there is no a priori knowledge of existing signals.

These and other examples of the invention will be described in further detail below.

BRIEF DESCRIPTION OF THE DRAWINGS

Preferred and alternative examples of the present invention are described in detail below with reference to the following drawings:

FIGS. 7A, 7B, and 7C shows the indoor test environment, specifications and the received GSM signal specifications used to test the experimental apparatus of the present invention described with respect to FIGS. 6A and 6B.

DETAILED DESCRIPTION OF THE PREFERRED EMBODIMENT

The present invention provides an alternative to GNSS coupling with inertial sensors by using other RF signals to detect speed, displacement, and potentially direction, which can be combined with inertial and other environmental sensors to produce highly precise and accurate physical state information in situations where GPS/GNSS is not available. RF signals including cellular, digital television, Wi-Fi, and other terrestrial communication signals have much better indoor penetration characteristics compared to the very weak signal GPS/GNSS. Readily available existing signals within the spectral domain of 400 MHz and 2.5 GHz can provide useful Doppler and displacement information, which can be used in conjunction with inertial data to provide position and velocity estimates for people and objects moving at relatively slow velocities. RF Doppler observables provide the functional equivalent of the ZUPT without the necessity of the full stop or additional hardware. The result is an autonomous positioning capability that is readily adaptable to handheld mobile wireless devices such as a smart phone, tablet, and digital cameras.

The preferred embodiment of the present invention uses the technique of Spectral Compression Positioning (SCP) to produce Doppler velocity and displacement observables for a variety of signals of opportunity that may be available in GPS/GNSS obstructive environments. Alternative embodiments are also possible that extend the receiver signal processing of existing communications devices enabling relatively minor changes to existing device designs. With the advances in software defined radio and digital signal processing these techniques can be readily implemented in baseband processors as software, which provides the opportunity to augment existing devices with little or no physical changes.

General Architecture and Signal Processing

Given the wide variety of RF signal processing and data processing implementations, this section teaches the present invention by way of a logical design discussing the key system complements and methods independent of an explicit implementation. Subsequent sections will discuss an exemplary implementation of the preferred embodiment of the present invention.

Figure 1A:
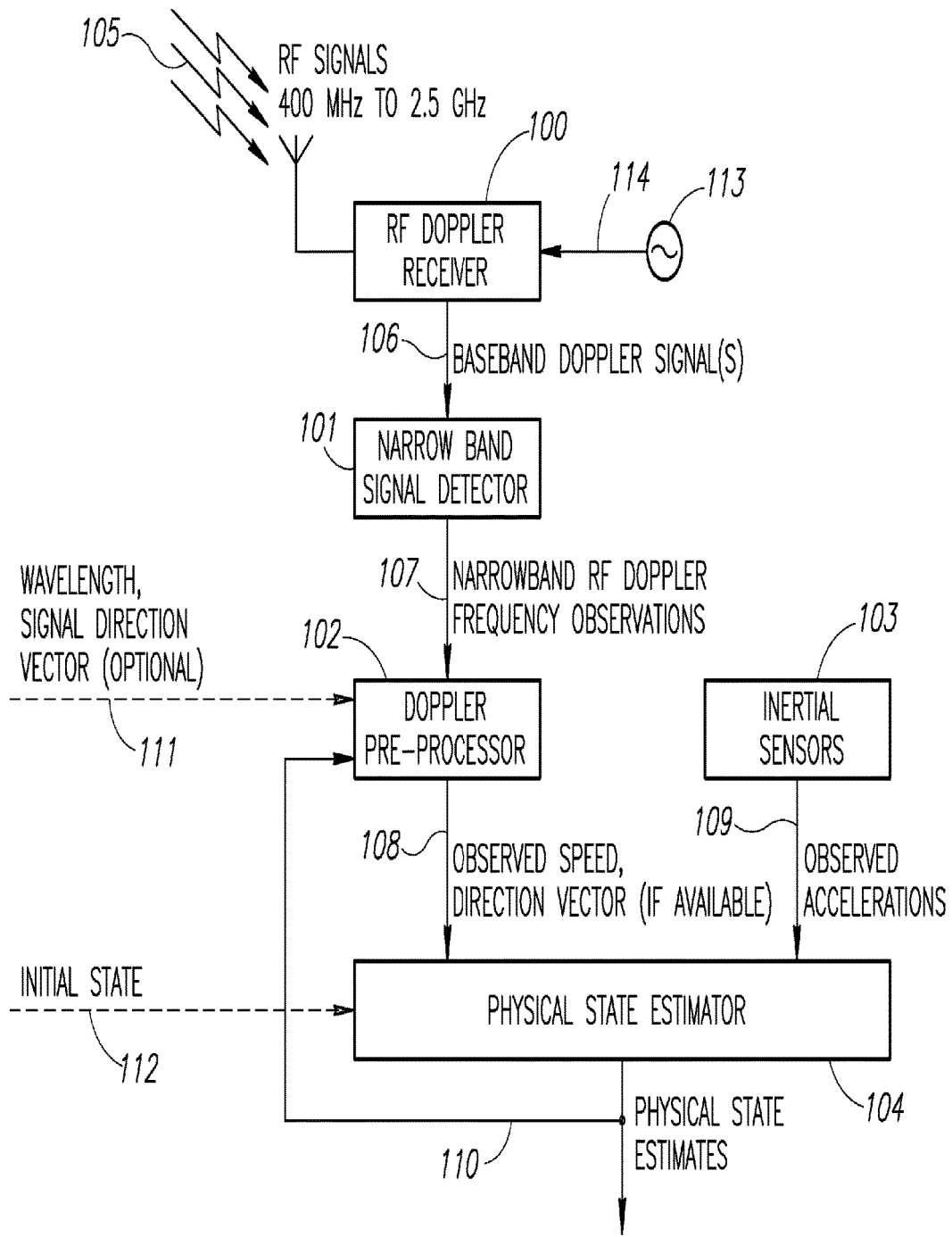
FIG. 1A is a logical systems diagram showing the essential elements of the present invention where an RF Doppler receiver provides narrowband RF Doppler frequency observations by means of high resolution spectral analysis in combination with inertial sensors to produce an estimate of a physical state of the device. The physical state includes position, speed and direction.

FIG. 1A illustrates the essential functional blocks of the present invention combining RF Doppler frequency shift observables with linear and rotational acceleration data from inertial sensors. RF Doppler Receiver 100 intercepts RF signals 105 in the spectral regime between 400 MHz to 2.5 GHz. The receiver 100 amplifies the received signals and performs a coherent down conversion to baseband or near baseband such that the signals of interest can be readily processed for extraction of the Doppler observables. The signal down conversion is performed coherently relative to the reference oscillator 113 such that any frequency biases introduced during down conversion are traceable to the reference oscillator via the Physical State Estimator 104.

A significant advantage of the present invention is its ability to produce useful speed and displacement measurements for human worn devices using intercepted signals of opportunity where the range in speed of motion will be typically less than 10 m/s with a desired measurement precision of better than 15 cm/s and fractional positional displacement drift error of better than 2%. This level of performance is best achieved by use of a reference oscillator that has relatively good short-term frequency stability. As will be discussed further in the specification, the short-term stability of the reference oscillator is preferably at least 0.5 parts per billion (ppb) over 3 to 5 seconds to provide the requisite precision in order to sense the equivalent velocities at 15 cm/s.

The baseband or near baseband Doppler signals 106 are then processed using a Narrowband Signal Detector 101. The detector 101 extracts one or more Doppler frequency observations for the intercepted signals at the desired fractional frequency precision of 0.5 ppb. The fractional frequency precision is determined by dividing the Doppler frequency shift by the nominal frequency of the carrier or subcarrier extracted from the received signal by means of 100. Narrowband signal detection is used to provide higher measurement precision by means of an effective process gain.

Conventional Doppler frequency detection algorithms used in communication signal processors typically do not need track Doppler frequency shift any better than about 20 ppb. This is usually sufficient to provide the appropriate compensation for Doppler frequency shift during signal processing. For example, consider a W-CDMA cell phone with a QPSK spread spectrum chipping clock rate of 3.84 MHz and a carrier frequency of 1936 MHz. One design approach is to cross-correlate the intercepted signal with a local code replica running at the same nominal clock rate and then track the Doppler frequency shift using the recovered carrier. For a fast moving object with maximum speed of 50 m/s, the frequency shift for the chipping clock will be a maximum of 0.64 Hz. To maintain correlation lock of ⅛th of a cycle for at least 2 seconds, a 0.1 Hz frequency measurement precision is required. This is equivalent to 26 ppb fractional precision.

The narrowband Doppler frequency observations 107 are processed by the Doppler Preprocessor 102 given configuration information 111 for the intercepted signals and current estimates of physical state 110. The information 111 may include wavelength and potentially information about the signal source direction (signal direction vector) if it is available. The Preprocessor 102 converts Doppler frequency observations to speed and direction observables with associated measurement uncertainties taking into account the Doppler frequency extraction method, the estimated level of multipath in the environment and availability of signal direction vectors.

Inertial sensors 103, which may include multiple linear and/or rotational accelerometers representing one or more of the inertial axes, measure the accelerations experienced by a device or object. These sensors are typically fixed within the device or body such that they measure linear or rotational acceleration placed orthogonally relative to the other sensors in one, two or three dimensions. With three dimensional configurations, vertical orientation of the sensor the sensor can also be determined by noting the gravitational direction vector (the direction with magnitude near 9.8 m/sec2). The observations produced by the sensors will contain systematic biases resulting from the particular implementation of the sensor that will change as the accelerometers are moved and reoriented. These biases can be diminished or mitigated with filtering but cannot be entirely removed, which creates the need to use the Doppler data as a means to remove the average biases over time intervals exceeding a few seconds.

The Doppler observables 108 and acceleration observables are passed to the Physical State Estimator 104 together with the initial state configuration information 112. This information is then processed to produce an update of the physical state 110, which contains estimates of position, orientation, and one or more temporal derivatives. The Physical State Estimator 104 is typically an Extended Kalman Filter (EKF), or combination of estimators in a federated configuration, that updates the current state using least-squares error minimization or maximum likelihood techniques.

For example, one embodiment the Physical State Estimator for the present invention uses a federated EKF implementation combining multiple separate EKFs to minimize processing requirements and to add additional control parameters (federated gains) for fuzzy logic. This estimator is comprised of a Body State Filter, a Step Analyzer, Map Matcher (shown in FIG. 1B), and Fusion Filter. The Body State Filter fuses the inertial and compass data. The Step Analyzer determines step-size and step-rate given Doppler speed and inertial data. The step-size and step rate can be used by the Physical State Estimator to update at least one member of a physical state of a mobile device. The Map Matcher maps physical state estimate to available map data and generates corrections given the constraints of the physical environment. The Fusion Filter combines the output of all the filter components to produce the best estimate of physical state.

The implementation and configuration of the Physical State Estimator will change depending upon the available data and desired outputs. The following describe alternative and exemplary embodiments of the present invention combining Doppler, inertial, environmental and/or map data.

The generalized architecture shown in FIG. 1A can be applied to almost any device containing an RF Doppler receiver and one or more inertial sensors. The implementation is not limited to just one type of signal (e.g. cellular) and can be applied to virtually any signal that can be intercepted that has useful Doppler observation information. The preferred embodiment of the present invention is to use an SCP sensor to extract the Doppler frequency observations from intercepted signals; however, other RF receiver technologies such as those found in current cellular and digital television receivers could be adapted provide the similar function, subject to limitations as to the types of signal supported.

Figure 1B:
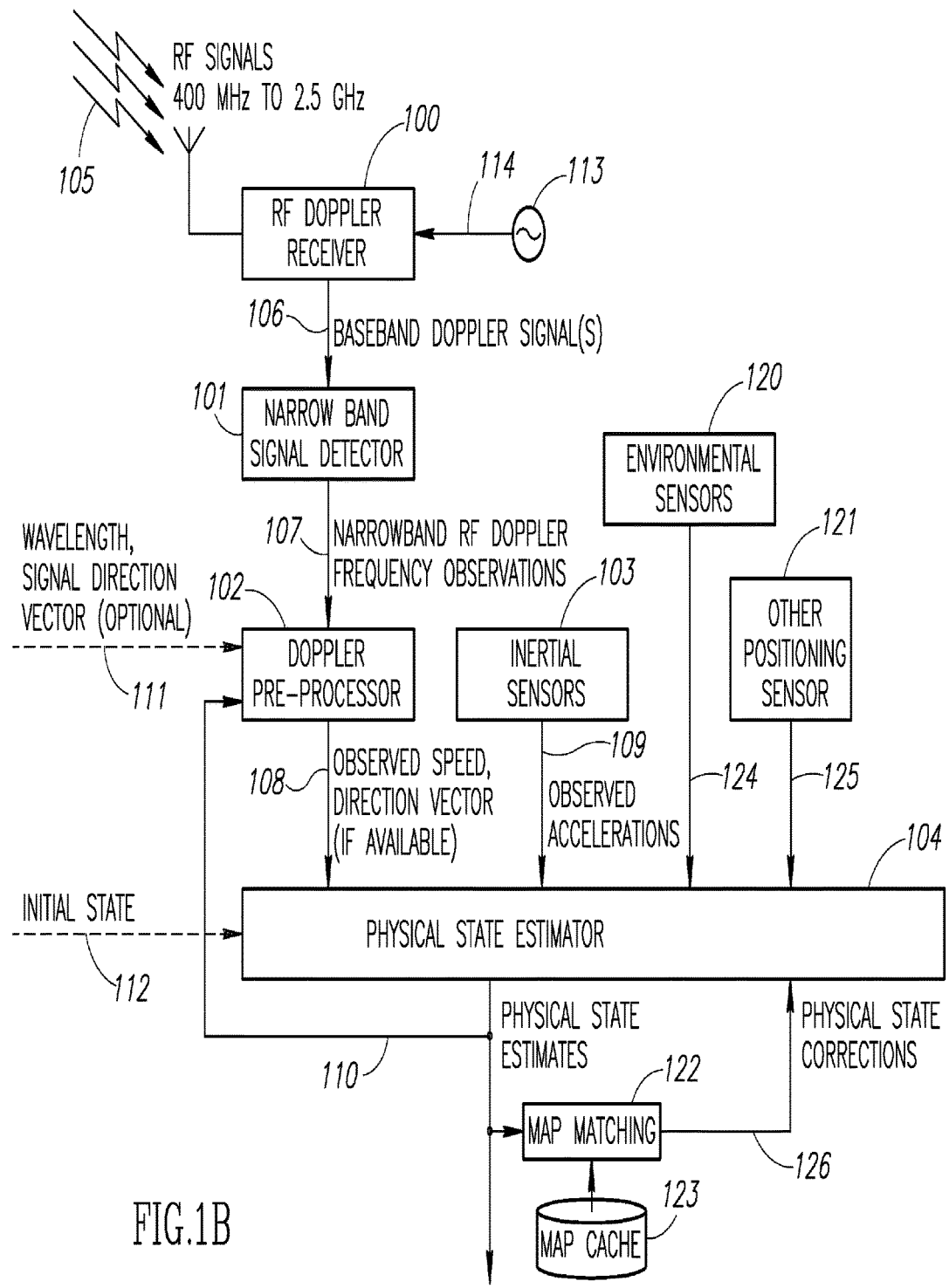
FIG. 1B is a logical systems diagram showing an alternative embodiment of the present invention with additional elements providing environmental information including magnetic and barometric information as well as other positioning sensors to provide for both absolute and physical state position and orientation. Diagram also shows the addition of mapping data and map matching algorithms to correlate physical state estimates with physical constraints imposed by the local environment.

FIG. 1B shows extended logical system architecture for the present invention that incorporates the use of Environmental Sensors 120 and Other Positioning Sensors 121 to provide additional information about the physical state, thus improving overall performance and reliability. Environmental sensors 120, which include for example magnetic compass, barometric pressure and vertical orientation sensors, provide additional information about the devices current orientation and physical displacement. This information can be used in conjunction with the inertial sensors and RF Doppler sensors resulting in a more precise and accurate physical state estimate. For practical applications in mobile devices such as a smart phone, the combination of RF Doppler, inertial, and environmental sensors is preferred to produce relative physical state estimates.

Most third-generation (3G) and fourth-generation (4G) smart phone devices incorporate both inertial and environmental sensors, which are used for a variety of applications supporting user interface and situational awareness. Additionally, these devices also incorporate GPS, Wi-Fi and Cell ID techniques for position sensing. While these techniques do not provide meter accuracy positioning information in GPS obstructed environments, they can provide a point of beginning for relative positioning using the present invention.

Other Positioning Sensors 121 may include GPS/GNSS, assisted GPS/GNSS, Wi-Fi Received Signal Strength Indication (RSSI), Cell ID, Bluetooth beacon or RFID tag. Data from these sensors are useful to provide point of beginning information and to validate that current physical state estimates for location are within expected levels of uncertainty. Wi-Fi RSSI and cell ID are typically insufficient by themselves to provide for the point of beginning in the present invention, but they can serve to verify that the device is near the same location as it was during previous physical state estimates.

As shown in FIG. 1B, Map Matching 122 may also be used to provide additional physical state corrections 126. Physical State Estimates 110 are analyzed relative to the current map information stored in the Map Cache 123 to verify or determine the current path traversed. A maximum likelihood estimator is preferably used to compare physical state estimates with physical corridors and passageways within a structure making sure the device does not go through walls. Further, the path traversed is compared to the layout of the structure so that the path can be correlated to determine a better estimate of the current and past physical state. With continuous physical state estimates for a body or device in motion, map matching provides the ability to verify the current position and improve upon the estimated position given sufficient observations.

The preferred embodiment of the present invention incorporates RF Doppler, inertial and environmental sensor information with map matching techniques to produce the best possible position information. However, map data may not always be available due to network outages or the need to operate autonomously. In these cases, overall performance may degrade slightly.

Figure 1C:
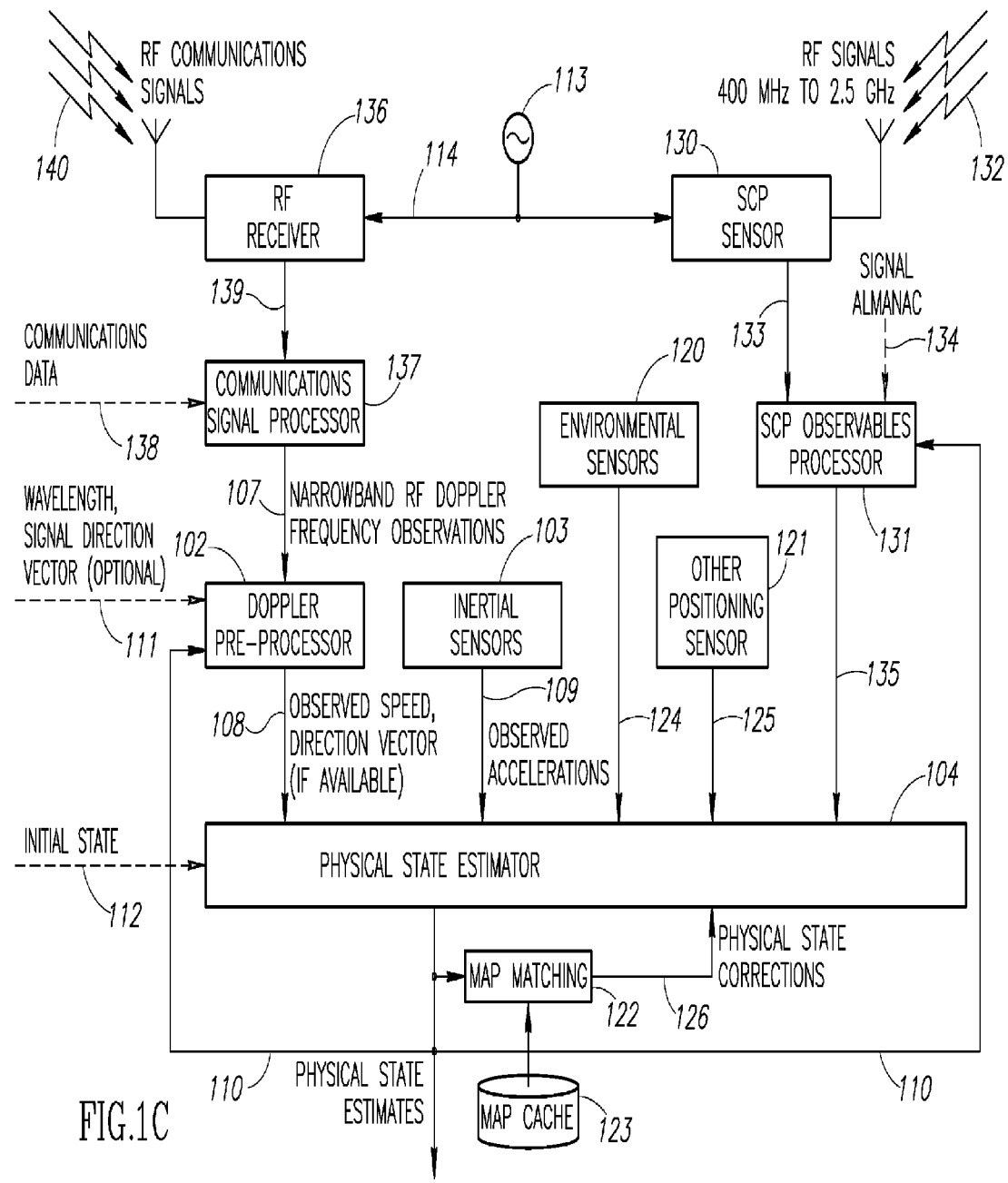
FIG. 1C is a logical systems diagram presenting an alternative embodiment of the present invention where the RF Doppler receiver is comprised of a communications receiver similar to a cell phone and an SCP sensor enabling Doppler signal processing of existing communications as well as other signals of opportunities provided by the SCP sensor.

FIG. 1C shows a logical systems architecture for an alternative embodiment of the present invention where an RF communications receiver and an SCP sensor are used separately to produce RF Doppler observables. RF Receiver 136 and SCP Sensor 130 are tied 114 to a common Frequency Reference 113. This results in a common bias for Doppler observables which can be estimated and removed enabling simultaneous reception of multiple RF Doppler signals. The RF receiver intercepts communication signals 140 and processes them using a Communication Signal Processor 137. Blocks 136 and 137 represent a typical cellular receiver radio comprising an RF receiver engine and baseband signal processor. The traditional output of the signal processor 137 is the received data communications 138. As discussed previously, the intercepted communication signals 139 can also be processed by an extension to the processor 137 producing narrowband RF Doppler frequency observations 107.

Similarly, SCP Sensor 130 intercepts other freely existing signals of opportunity between 400 MHz and 2.5 GHz producing SCP Observables 133, which include amplitude, phase and frequency data of the intercepted signals. These observables can include the Doppler observations for both carrier and sub-carrier modulations. An SCP Sensor can produce a rich variety of observables that are useful in the determination of relative speed and displacement. This is in addition to the more traditional network-based approach of SCP positioning. The relative speed and displacement sensing using SCP enables an autonomous approach where the signal source location is not needed in order to produce a useful physical state estimate.

An SCP Sensor 130 is comprised of a wideband RF receiver engine and a signal processor that implements spectral compression positioning methods. Spectral compression positioning is a method whereby one or more nonlinear operators are used to extract changing physical characteristics in the form of amplitude, phase and temporal derivatives of the intercepted signal without regard to the preservation of information content modulated within the intercepted signals. The process of extraction utilizes at least one or more unknown physical characteristics of the intercepted signal to distill wideband spectral content into a narrowband regime, which preserves the physical characteristics, including the Doppler frequency shift. The distillation of wideband spectral content can be performed without regard to modulated information content enabling effective process gain that yields high signal-to-noise ratio for the extracted physical characteristics. The specific methods and techniques for implementing spectral compression are documented in U.S. Pat. No. 7,511,662 (hereafter the '662 patent), which is incorporated by reference in its entirety.

The SCP Observables Processor 131 translates the SCP Observables 133 into usable speed, direction, and associated uncertainties data 135, which is then passed to the physical state estimator 104. Block 131 is equivalent in function to the Doppler Preprocessor 102 shown in FIG. 1A; it is specialization to support SCP based data processing. The current Physical State Estimate 110 and Signal Almanac 134 comprising known configuration data about the signal source (wavelength, optional direction vector, multipath characteristics, etc.) provide the means to transform the observables into format consumable by the Physical State Estimator 104.

Figure 1D:
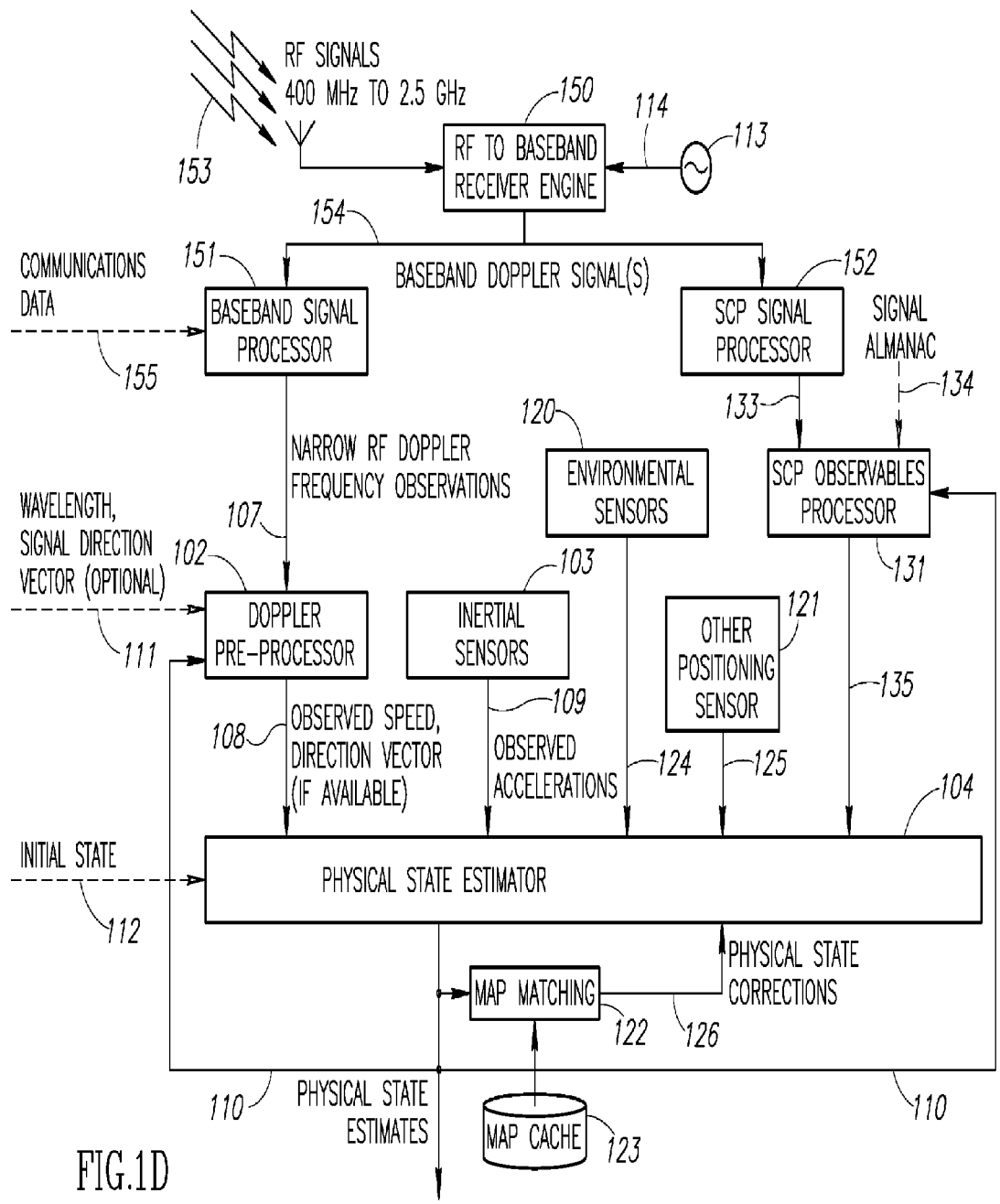
FIG. 1D is a logical systems diagram presenting yet another alternative embodiment of the present invention where a common RF baseband receiver engine is shared both by a communications baseband signal processor and an SCP signal processor to produce Doppler observations.

FIG. 1D is yet another alternative embodiment of the present invention where a common RF Receiver Engine 150 is shared with a communications Baseband Signal Processor 151 and an SCP Signal Processor 152 in order to minimize the number of redundant components in a wireless device. For example, this configuration might be used in a smart phone device. The RF front end 150 would be shared and controlled such that both communications and RF location sensing could be accomplished. The SCP signal processor 152 would monitor the intercepted signals for communications, processed by block 151, and also intercept other non-communication related signals to improve positioning performance. The growing availability of ultra-wideband transceiver engines makes it possible for a single receiver engine to cover the entire frequency band 153 between 400 MHz and 2.5 GHz. In regards to the present invention, this range of frequencies covers most of the RF signals of interest that are well suited for Doppler velocity measurements.

The SCP Signal Processor 152 is essentially equivalent to an SCP Sensor 130 in FIG. 1C without the RF receiver engine built-in. The output of the SCP signal processor 152 is functionally equivalent to block 130, which are SCP Observables 133 discussed previously. The Baseband Signal Processor 151 is functionally equivalent to the Communication Signal Processor 137, discussed previously, processing received signals and producing data communications, which is the primary purpose of the block.

The Baseband Signal Processor 151 may also produce Narrowband Frequency Observations 107 for signals of interest, which can be correlated with the results produced by the SCP signal processor resulting in higher performance. Doppler observations from processor 151 are not strictly required in this alternative embodiment of the present invention since the SCP signal processor is capable of producing equivalent information for the same set of signals.

Figure 1E:
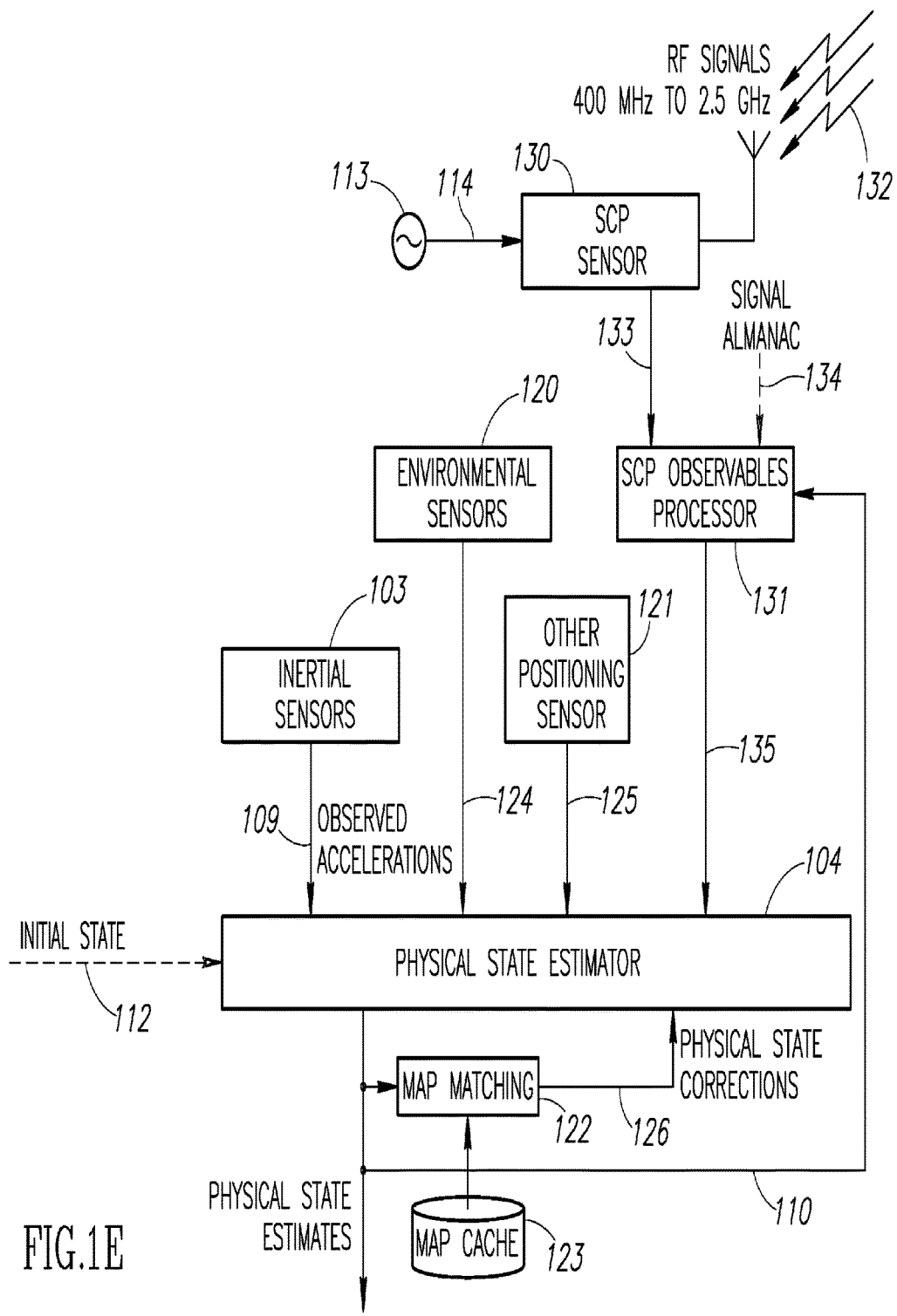
FIG. 1E is a logical systems diagram presenting yet another alternative embodiment of the present invention were only an SCP sensor is used to detect Doppler observables from signals of opportunity in conjunction with inertial sensors, environmental sensors, and potentially other positioning sensors to produce physical state estimates.

FIG. 1E shows yet another alternative embodiment of the present invention where an SCP sensor alone is used to produce SCP Observables 133 containing RF Doppler observables, which are ultimately combined with environmental and inertial sensors to produce physical state estimates. This embodiment is useful for devices that may not have existing wireless communications technology or an existing GPS sensor. The use of an SCP Sensor 130 is loosely integrated into such a device in that its operation is not necessarily affected by the Physical State Estimates 110.

One illustrative example of this alternative embodiment is a location sensor module comprising an SCP Sensor 130, Inertial Sensors 103 for linear and rotational acceleration and Environmental Sensors 120 providing magnetic and barometric (relative height information. The Other Positioning Sensor 121 would not necessarily be required as the SCP Sensor 130 can also sense GPS/GNSS signals, Wi-Fi and others as needed providing equivalent capability. The Physical State Estimator 104 and Map Matching 122 functions may be implemented in the module or in a host device as processing capabilities support. As discussed previously, map matching may also be optional depending on the particular needs of the application utilizing the Physical State Estimates 110.

FIGS. 1A through 1E show various functional embodiments of the present invention, which can be adapted to support a number of physical configurations depending upon the capabilities of the device and intended applications. Other alternative embodiments are also possible without departing from the spirit of the present invention in the use of RF Doppler Frequency observables from signals of opportunity processed to produce useful speed and direction observations such that they can be combined with inertial and environmental sensor observables producing reliable positioning information while in highly obstructed GPS/GNSS environments particularly indoors. The present invention exploits RF Doppler observables to constrain and correct the drift in inertial sensors.

Figure 2A:
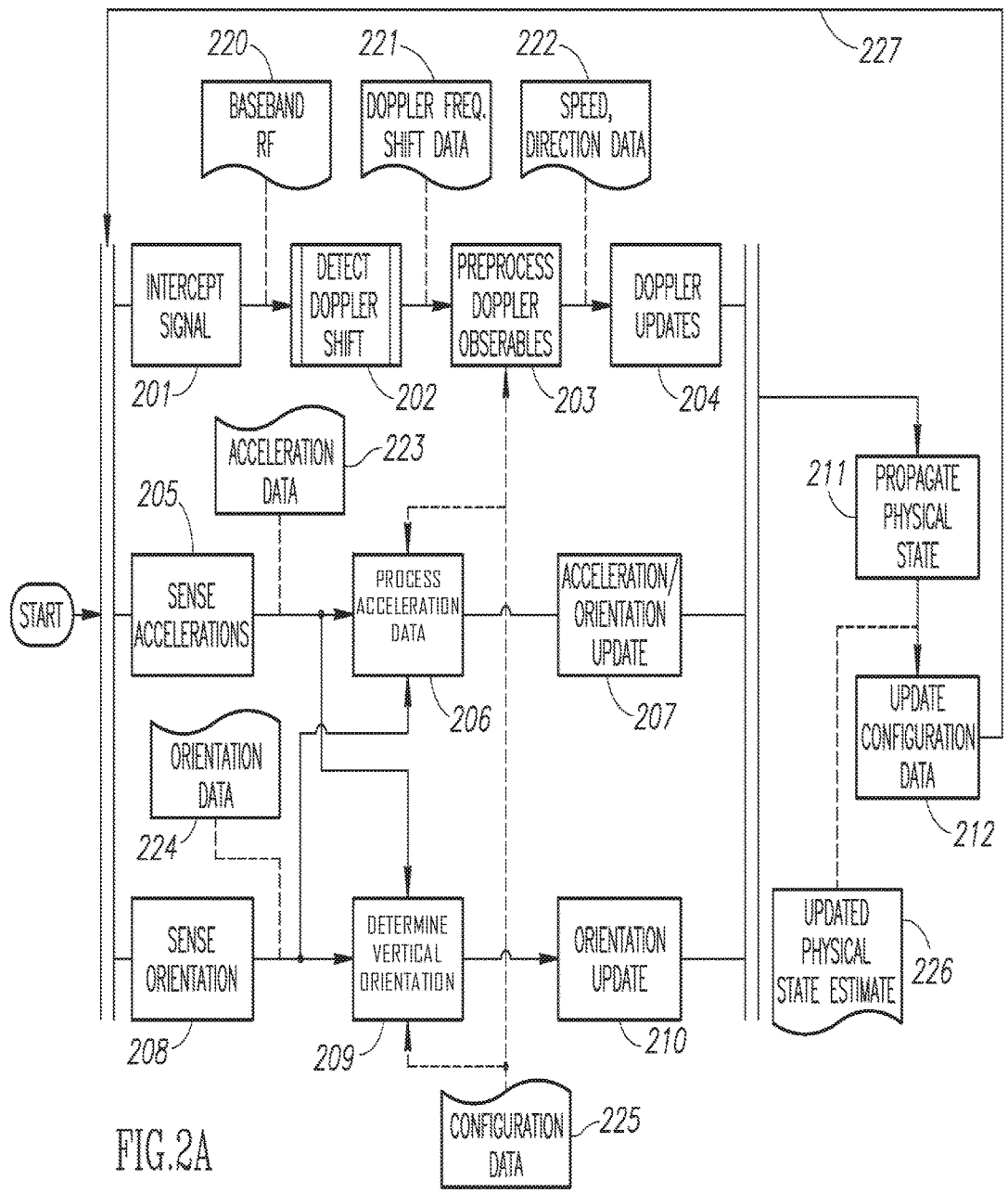
FIGS. 2A through 2F are logical data flowcharts detailing the process flow for the present invention where RF Doppler frequency shift data are combined with inertial acceleration and environment orientation data to produce updates for a physical state estimate.

FIG. 2A shows a logical signal processing flowchart for the present invention where simultaneous observations of the RF Doppler frequency shift, inertial acceleration and orientation observables are used to update physical state information for a device or object to which they are attached. Starting with block 201, one or more RF signals are intercepted and down converted to baseband or near baseband producing baseband RF data 220. Step 201 amplifies and transforms intercepted frequency information such that it can be suitably processed by the Detect Doppler Shift 202. Step 202 applies one or more methods to extract the instantaneous Doppler Frequency Shift Data 221 for the intercepted signals. As will be discussed in a subsequent section, the present invention provides for multiple methods for processing RF signals to produce Doppler shift observables requiring no a priori information about the source of the intercepted signals.

The Doppler Frequency Shift Data 221 is then processed by step 203 given consideration of the Configuration Data 225, which includes current physical state estimates, producing Doppler Speed and Direction 222 observables with associated measurement uncertainties. Depending on the number of signals and Doppler shift detection methods used in step 202, directional observables may be limited or unavailable. The speed observables are the primary value in that they provide a definitive indication and rate of motion. Observables 222 are then used to update the physical state estimate using Doppler Update 204. The particular method of update is dependent upon the estimator used.

For example with a conventional EKF type estimator, the update is typically the mapping of the observations to the physical state at the current epoch. The preferred embodiment of the present invention uses a federated EKF estimator to combine the estimates from the Doppler, acceleration and orientation processors. A federated filter approach provides improved processing efficiency and provides additional control and quality assessment.

The inertial acceleration processing comprising steps 205 through 207 and orientation sensing steps 208 through 210 execute in parallel with the RF Doppler processing. Block 205 senses both linear and rotational acceleration data 223, which is processed in step 206 to remove gross systematic biases and drift and also processed in step 209 to determine vertical orientation. Preprocessing can consist of simple filtering and may also include coordinate transformations and other filtering that simplifies filter updates in subsequent steps. Filtering can include reducing high-speed transients or down-sampling: producing a sample rate reasonable for dynamics with less than 3 g accelerations or with persistent motion less than 10 m/s. These dynamics limitations are consistent with typical human body motions. Given Configuration Data 225, preprocessing may also transform linear and rotational accelerations into non-body fixed reference frame such as a local East-North-Up (ENU) or even WGS-84 frame. Acceleration Update 207 maps acceleration observables onto the physical state estimate at the current epoch.

Similarly, orientation sensing using environmental sensors provides the relationship between the body/device reference frame and a fixed reference frame such as ENU. Orientation information is preferably used to relate acceleration data to observed RF Doppler data and provide for the transformation between the two different reference frames. In most cases given the stationary fixed frame signal sources used to measure the Doppler shift, this transform is either directly measured as in step 208 or it assumed by giving some constraint as part of the configuration data 225: e.g. the device always points in the direction of maximum motion. The preferred embodiment of the present invention uses magnetic orientation data 224 with body orientation data derived from acceleration data 223 to provide orientation information in real-time relative to some absolute reference frame (e.g. WGS-84 or local ENU). The Preprocess Orientation Observables 209 may filter or apply calibration such that systematic errors are removed prior to Orientation Update 210.

Once updates have been applied, the physical state can be propagated to the next epoch in step 211. The updated physical state 226 can then be used to update sensor configuration data 225 and in the process repeats again 227. The preferred embodiment of the present invention also implements forward prediction to reduce latency. Latency will occur as a result of filtering RF Doppler data to remove noise transients. This can be readily identified using accelerometer data and then subsequently removed using adaptive and predictive filtering techniques.

Figure 2B:
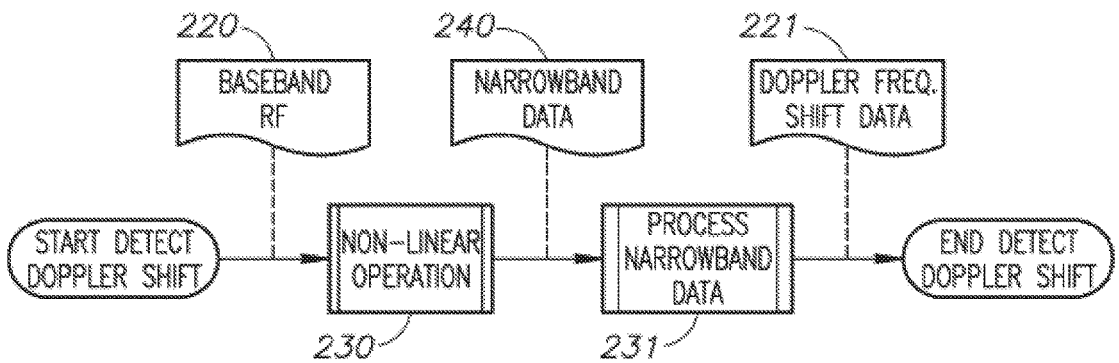
Figure 2C:
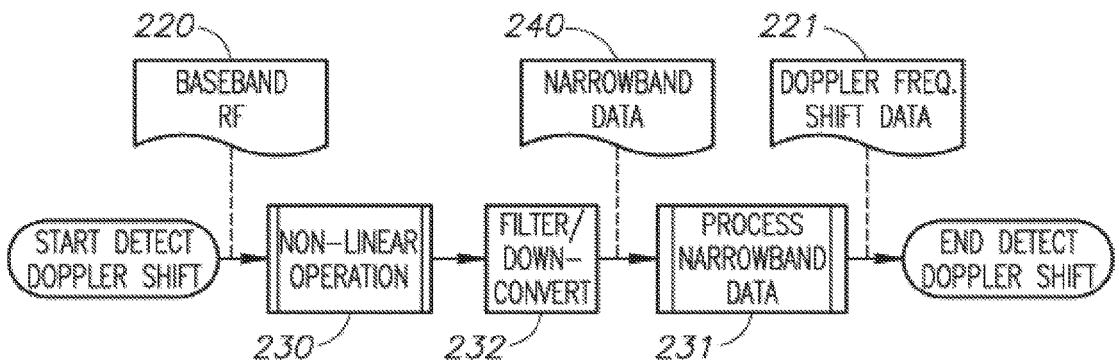

FIG. 2B shows one method for detecting Doppler shift using Spectral Compression Positioning methods as described in the '662 patent. In this method, the raw baseband RF signals 220 are first processed by nonlinear operation 230, which results in a narrowband data 240. Step 231 then processes the narrowband data 240 through one or more signal detection algorithms which produces Doppler frequency shift data 221. Similarly, FIG. 2C shows an alternative method for processing baseband RF using spectral compression positioning techniques where a filter/down converter 232 is placed between the nonlinear operator 230 and process narrowband data 231 steps. Step 232, while not explicitly required for the present invention, is useful to limit the narrowband data to the signals of interest where the down conversion frequency and filter bandwidth are adjusted to output only the signals of interest. For digital signal processing systems this can have a beneficial effect of significantly reducing processing requirements. FIGS. 2B and 2C are effectively equivalent and for the purposes of the present invention are treated the same.

Figure 2D:
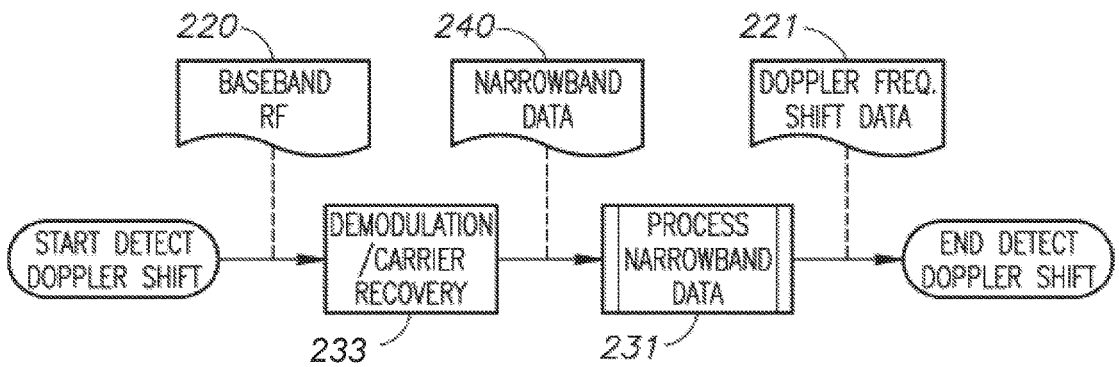

FIG. 2D shows an alternative method for Doppler shift detection using more traditional demodulation and carrier recovery techniques, step 233, that would be an alternative embodiment in devices where existing communications demodulation signal processing is already present. Baseband RF 220 is processed through traditional demodulation techniques, e.g. CDMA code correlation, wherein one output is the recovered carrier amplitude, frequency, and phase information either in time or frequency domains. The resulting narrowband data 240 is then processed similarly in step 231 to the spectral compression signal detection methods of FIGS. 2B and 2C.

The nonlinear operations for step 230 are discussed in detail in the '662 patent (e.g., FIG. 13B). The traditional methods of spectral compression using nonlinear operations of squaring, delay and multiply, bandwidth synthesis, differentiation and decimation will produce one or more narrowband spectral data that will provide useful Doppler shift observations. The choice of the particular operation depends on the type of signal used and the desired spectral content. For carrier recovery, squaring or delay and multiply are typically the preferred operations.

Figure 2E:
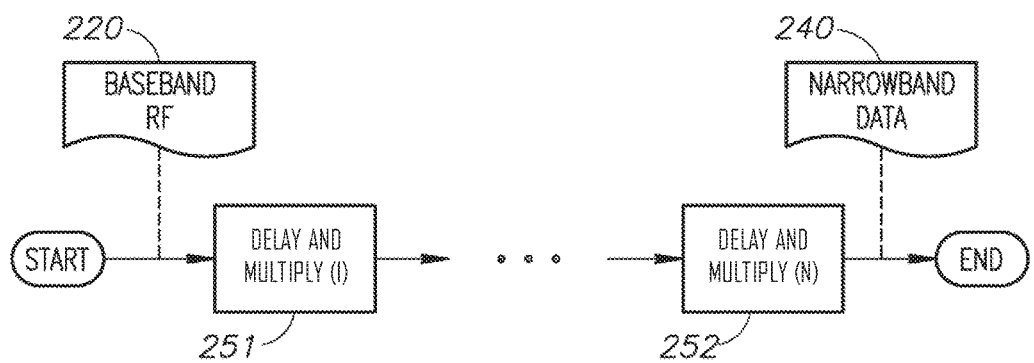

FIG. 2E shows another alternative nonlinear operation termed Cascaded Delay and Multiply. This operation applies two or more sequential delay and multiply operations on a given baseband RF signal 220, resulting in narrowband data 240. Each delay and multiply operation can be suitably tuned given choice of delays to target spectral content of interest. This technique is useful for processing polyphase signals such as QPSK (Quadrature Phase Shift Keying), where each step of the cascaded operation reduces the number of possible phase states by a factor of two. For example, a QPSK signal has four possible phase states. The first step in a two-stage cascaded delay and multiply operation reduces the QPSK signal to a BPSK signal with two possible phase states. The second step reduces the resulting signal to a mono phase state that will produce strong spectral line content for the recovered carrier. While this technique is not useful for recovering modulated data content, it provides a useful and effective means for recovering amplitude, frequency and phase information relating to the relative physics between the signal emitter and interceptor. Certain types of squaring can be applied sequentially as well using the Cascaded Delay and Multiply Method, where the delay values are all chosen to be zero. For very strong signals, simple squaring can produce useful observables but for signals that are weak, specifying delay values greater than zero will have the beneficial effect of randomizing the noise, producing higher signal-to-noise ratio observables for a given post detection bandwidth.

Figure 2F:
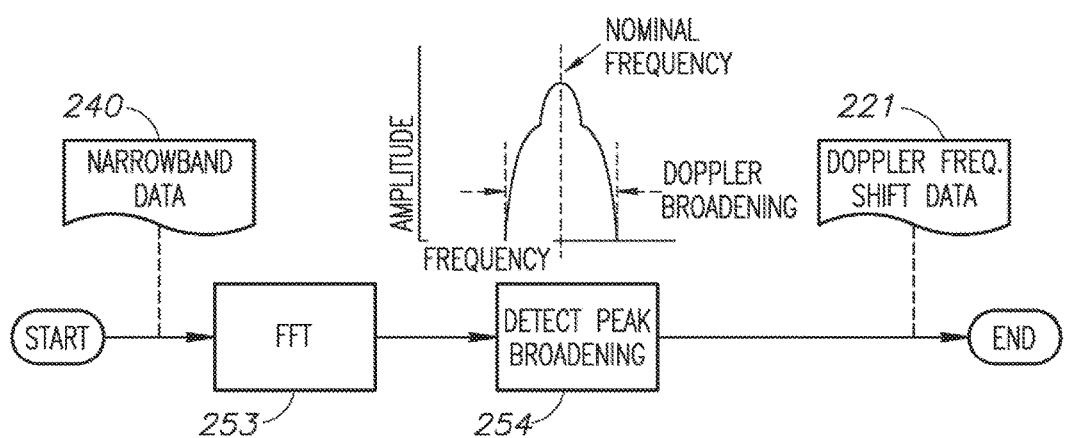

The methods typically used to process narrowband data, step 231, in FIGS. 2B, 2C, and 2D are discussed in detail in the '662 patent (e.g., FIGS. 13C, 13D and 13E). FIG. 2F shows another method for processing narrowband data utilizing peak broadening to determine the Doppler shift. Given the Narrowband Data 240, a Fast Fourier Transform (FFT) 253 transforms the time domain data into a frequency domain representation. The resulting spectral data is then processed by the Detect Peak Broadening step 254. As is discussed in greater detail with reference to FIG. 5, the Doppler shift is a function of the width of a spectral line when in the presence of complex multipath environments. The maximum width of the spectral line is a measurement of the relative maximum speed between an emitter and interceptor.

Depending upon the Narrow Band Data 240 extraction method used in steps 230 in FIGS. 2B and 2C, or step 233 in FIG. 2D, the width and shape of the peak broadening will change. For squaring or a single delay and multiply operation, the total width of the peak broadening is four times the Doppler shift. For a two-stage Cascaded Delay and Multiply operation, the width of the peak broadening is eight times the Doppler shift. For example, the demodulation carrier recovery operation of a GMSK modulation using SCP delay and multiply, the peak broadening is two times the Doppler shift.

Sensor Implementation Considerations

Figure 3:
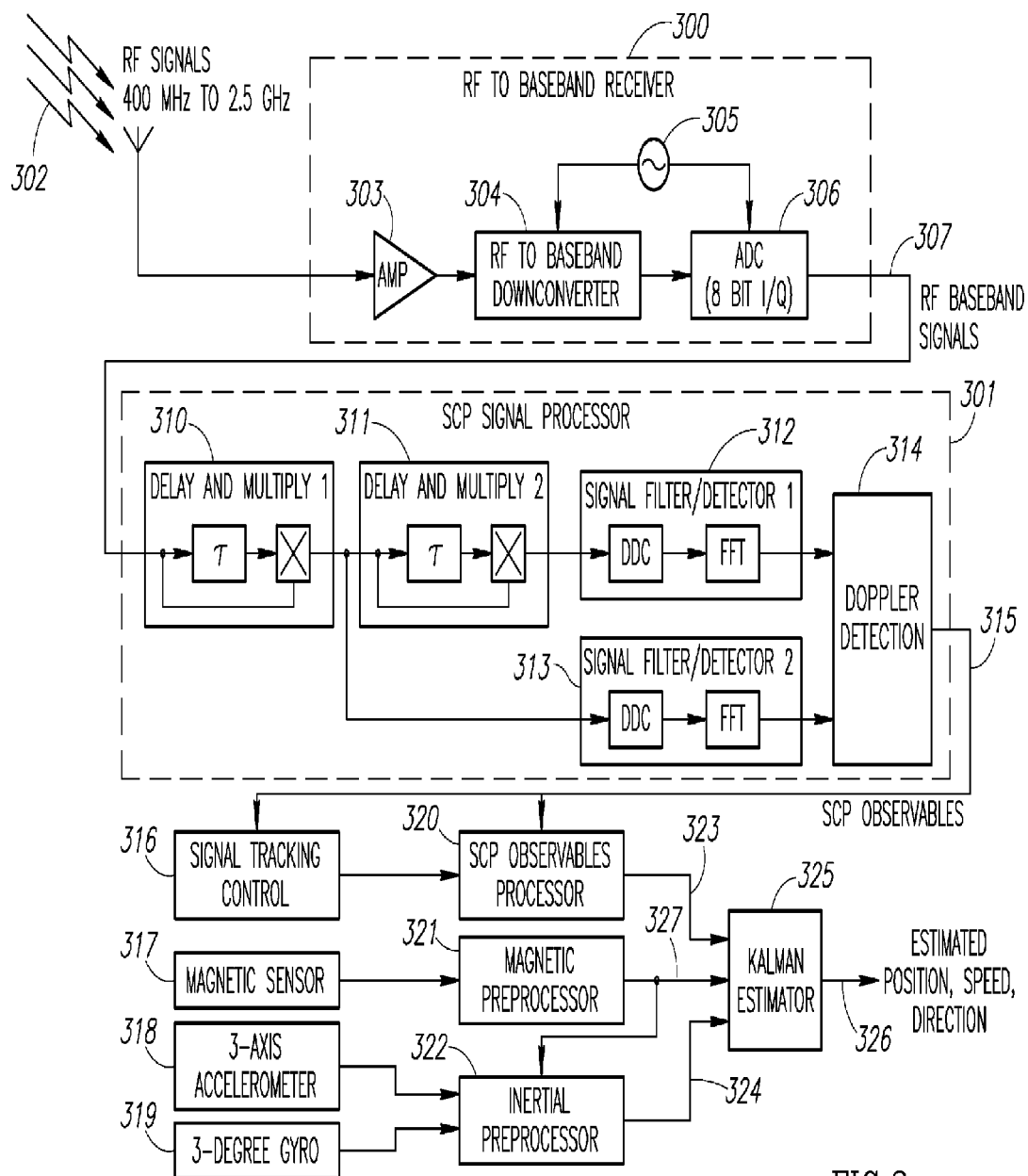
FIG. 3 is a detailed systems diagram showing the preferred embodiment of the present invention using SCP technology to produce SCP observables containing Doppler frequency observations processed in conjunction with linear and rotational acceleration and with magnetic direction data. Observations are fused together using a Kalman linear estimator producing an estimate of position, speed and direction.

FIG. 3 shows a detailed systems block diagram showing an SCP based embodiment of the present invention. In this configuration, a conventional SCP sensor is preferably fused with inertial and environment sensors using a Kalman based Physical State Estimator. Block number 300 illustrates the RF to Baseband Receiver. This receiver senses RF Signals in the RF spectral regime denoted as 302 Extending from 400 MHz to 2.5 GHz.

The input to the Receiver is through a low noise amplifier designated as 303 into a stage RF to Baseband Down converter designated as 304 whose output goes to an 8 bit analog to digital converter ADC (8 bits in-phase and quadrature), designated as 306. The synchronous functioning of stages 304 and 306 are constrained by a common reference oscillator 305. The output of block 300 is composed of RF Baseband Signals which are then input to the SCP Signal Processor block 301. The baseband signals are input to the first stage delay and multiply one designated as 310 whose output is routed to the Signal Filter/Detector designated as 313. Within block 313 there is the digital down converter, DDC, whose output passes to a Fast Fourier Transform, FFT. The output of stage 310 is also shared with a second Delay and Multiply stage, 311, whose output passes to block 312 Signal Filter/Detector 1. Stages 310 and 311 comprise a 2-stage Cascaded Delay and Multiply Technique, which can extract useful Doppler observations including QPSK, BPSK, OFDM, and GMSK type signals. The outputs of the pair of Signal Filter/Detector one and two are input to block 314 the Doppler Detector.

Using the narrowband signal process techniques discussed previously, the Doppler Detector 314 produces the SCP Observables 315, which pass through block 316, Signal Tracking Control, and block 320, SCP Observables Processor. Signal Tracking Control 316 adjusts the tuning for both the SCP Signal Processor 301 and RF to Baseband Receiver 300 to identify and track signals of interest. The method of selection prioritizes signals based on received signal strength, availability, and measurement precision. Signals with higher SNR and measurement precision are preferred over weak, less-precise, signals. The total number of signals tracked is dependent upon the available resources and number of processing channels. A single channel SCP signal processor can track up to four signals without significant degradation by increasing integration time if needed to achieve desired SNR. SCP Observables Processor 320 is equivalent in function to block 131 to discussions in FIG. 1.

Block number 317 is a Magnetic Sensor, most commonly a magnetic compass, whose output passes to a Magnetic Preprocessor 321. The inertial sensors 318 three-axis accelerometer and 319 a 3-Degree Gyro, gyroscopic sensor, are both input to block 322 the Inertial Preprocessor whose output is designated as 324.

Block 325 ingests the SCP observables 323, the magnetic compass data from block number 321 and the inertial data 324 into the Kalman Estimator that produces refined estimations 326 of position, speed, orientation, and motion heading.

RF Signal Doppler Detection

One aspect of the present invention is the measurement of speed using Doppler shift observations even in the presence of high multipath. In GPS obstructed, complex environments it is possible to determine the speed of motion of a device using external signals without a priori knowledge of the signal source location and direction. Further, measuring the speed of motion using Doppler shift can be accomplished without explicitly demodulating RF signals. In comparison, a traditional GPS/GNSS receiver requires a priori ephemeris and lockup of multiple GPS signals in order produce useful range and range rate observables. The ephemeris information is used in conjunction with the approximate location of the sensor to determine speed and direction.

The preferred embodiment of the present invention preferably utilizes two techniques to determine speed and relative direction without specific knowledge of the signal source location or local system clock biases. The first technique, termed Doppler Broadening, measures speed by examining the power distribution of the recovered carrier signal, where the distribution width is directly related to the speed. The second technique, termed Doppler Peak Shift, measures relative speed and potentially direction by noting the change in frequency of the recovered carrier. Depending on the detected level of multipath in the environment, either of these techniques may be used or both simultaneously.

Figure 4:
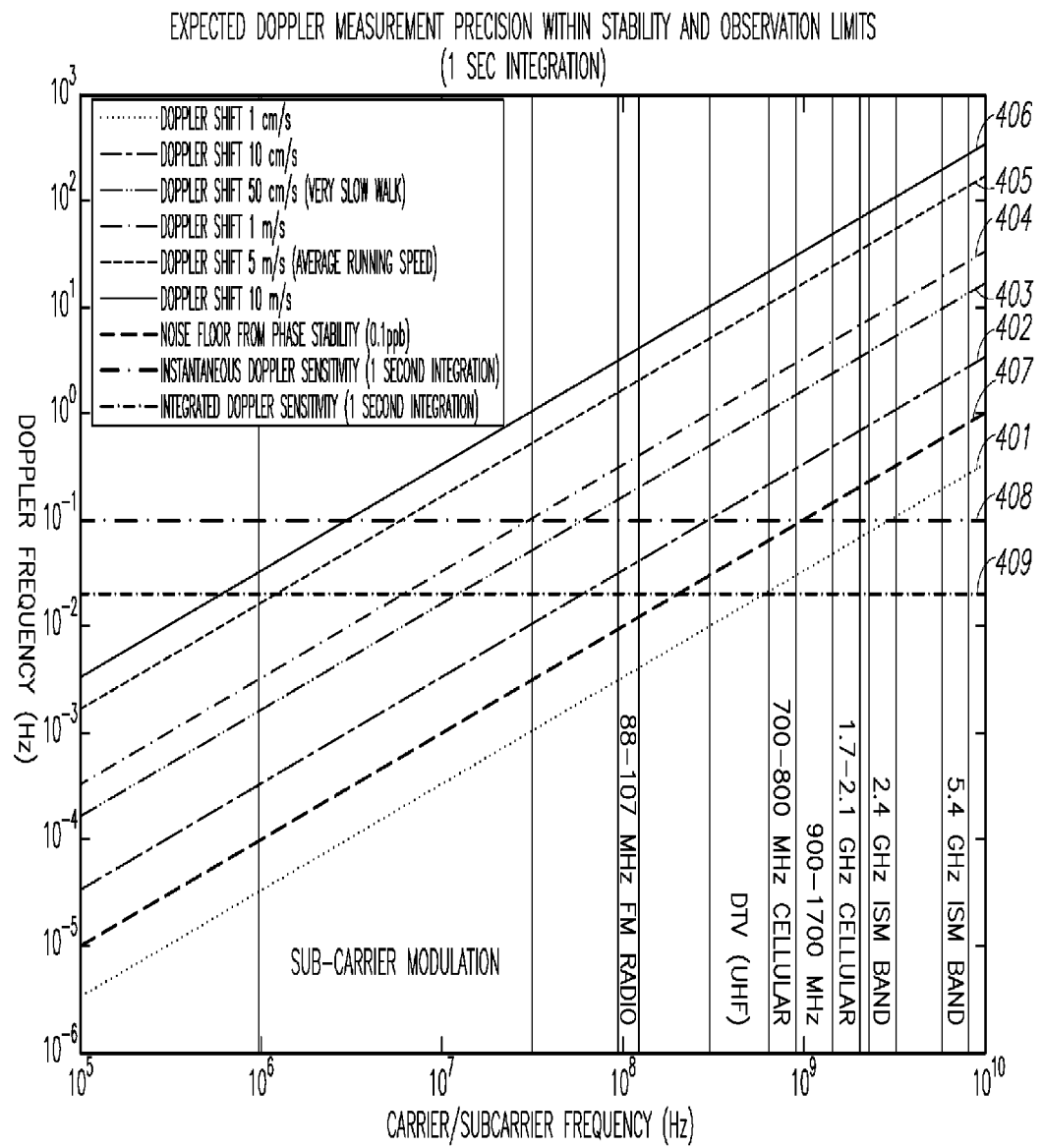
FIG. 4 is a chart showing the Doppler frequency offsets for various carrier and subcarrier frequencies given selected velocities consistent with pedestrian motion in the range between 1 cm/sec to 10 msec. Diagram also shows the expected measurement precision and stability given integration time and a 1 Part Per Million (PPM) temperature compensated crystal oscillator (TCXO).

FIG. 4 is a graph that shows the Doppler frequency shifts for various carrier and subcarrier frequencies between 1 MHz and 10 GHz. Lines 401 through 406 show the Doppler shift as a function of frequency for various velocities between 1 cm/s to 10 m/s. 50 cm/s, line 403, representing a very slow walk. The 5 m/s, line 405, is the average running speed for a person, while a 10 m/s speed is Olympic level performance. Normal walking speed is between 1 and 2 m/s for most people. In addition to the Doppler shifts, the graphs show the expected measurement sensitivity for Peak Shift Doppler detection, lines 408 and 409, using one second of coherent integration. Line 407 shows the noise floor stability for an oscillator with a stability of 0.1 ppb over one second interval. Many TCXOs found in modern wireless devices can easily achieve this figure merit. To detect pedestrian motion given the constraints indicated by 407, 408, and 409, the signals of interest for detecting Doppler shift start at about 100 MHz and higher frequencies. This means that signals including FM radio, UHF and digital television, cellular, GNSS, and Wi-Fi operate in an RF regime that can provide Doppler shift information usable to detect motion between 10 cm/s up to 10 m/s.

Tracking in much higher velocity applications is achieved by the current invention such as tracking a vehicle in Earth orbit where the along track velocity may be 7 km/sec. The maximum velocity to be projected onto a line of sight to an Earth based signal emitter would impose a 3 kHz Doppler shift on a terrestrial 600 MHz DTV signal. In the relatively multipath free environment of Earth orbit, a rate-aided, phase-locked loop tracking can be implemented to accommodate the high rate Doppler slewing at spacecraft closest approach to the DTV terrestrial location. There is also the possibility to even track spacecraft in the interplanetary flight because of the high power signals associated with DTV and the transmitter antenna patterns that illuminate outer space well beyond the usual terrestrial regions.

To extract the Doppler shift observables requires reconstruction of the suppressed carrier embedded within these signals. Explicit demodulation or SCP techniques can produce the Doppler observables; however, the SCP technique has the added benefit of multiple Doppler observation techniques, enabling operation even in highly multipath contaminated environments, where traditional carrier phase tracking using a phase lock loop or digital equivalent would have trouble providing the necessary Doppler shift measurement precision. In the preferred embodiment of the present invention, the SCP technique provides the most flexibility in Doppler shift frequency extraction for various types of signals. In that one sensor can be configured to intercept virtually any modern communication signal.

For velocities greater than 1 m/s or using greater than one second of coherent integration, FIG. 4 shows that subcarrier modulation can provide useable Doppler shift frequency observables. While not as precise or as sensitive to slow speeds, sub-carrier modulation tracking using SCP can provide very strong signals that are not as sensitive to the effects of the multipath environment as using carrier tracking. In practice, detecting Doppler shift using SCP with the P(Y) channel of the GPS has shown that it is possible to detect velocities as low as 30 cm/s with measurement precision better than 5 cm/s with integration time greater than 10 seconds.

Figure 5:
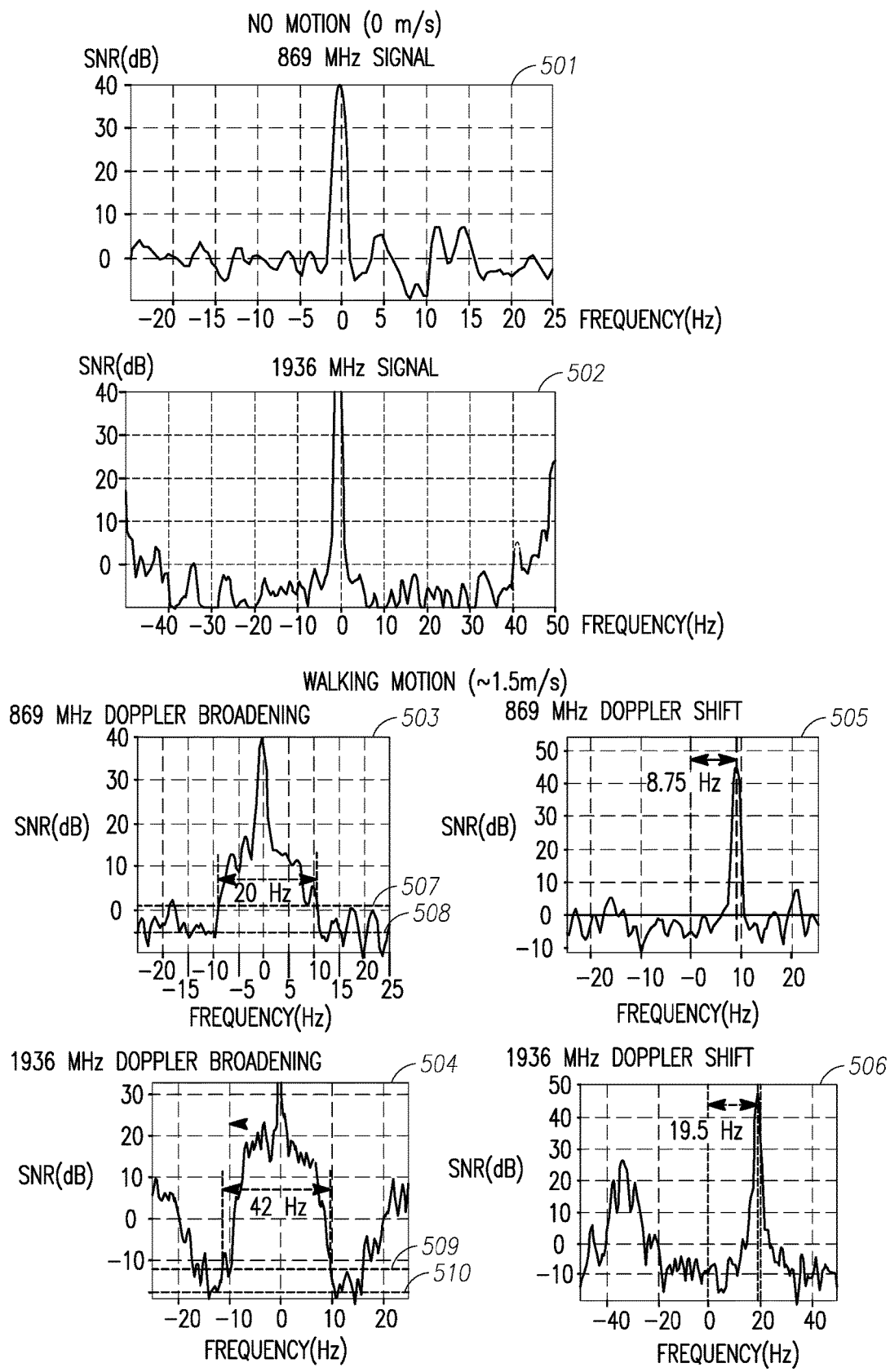
FIG. 5 shows a set of frequency domain plots resulting using Fast Fourier Transforms describing the techniques of Doppler shift measurement by means of Doppler peak broadening in unknown but complex multipath environments compared to traditional means of Doppler peak shift tracking in low multipath environments. The techniques are applied to GSM signals at 869 MHz and 1936 MHz.

FIG. 5 shows an illustrative example of Doppler Broadening and Doppler Peak shift for two GSM signals transmitting at 869 MHz and 1936 MHz. These data have been generated using the SCP signal processor implementation shown in FIG. 3. In FIG. 5, graphs 501 and 502 show intercepted signals that are a combination of the modulation clock rate (270.833 kHz) and the RF carrier second harmonic. The recovered spectral lines are for the case of a stationary device and stationary emitters with no Doppler shift. This signal has been produced by the delay and multiply method of spectral compression applied to a GSM signal. The spectral analysis results from using two seconds of coherent integration and additional three seconds of incoherent averaging (6 FFTs at a 2-Hz frame rate) resulting in a bin width of about 0.5 Hz and observation overlap of 3.5 seconds (new independent observation every 4 seconds).

In the preferred embodiment of the present invention, the amount of coherent integration, spectral averaging and subsequent smoothing are adjustable to capture desired kinematics, measurement precision required and type of RF signal being intercepted. The settings chosen for the example in FIG. 5 are illustrative and have been shown to be effective for processing GSM signals providing a good balance between measurement precision and latency for pedestrian kinematics.

The nominal 3 Hz width of the spectral lines, essentially the same in graph 501 and 502, is due to the Hanning windowing used in constructing the spectral display. The introduction of Hanning windowing in the FFT processing reduces transient effects caused by the transformation of continuous signals using a non-continuous transform.

Graphs 503 and 504 show the intercepted signal for a device moving at 1.5 m/s in a multipath rich environment. In these figures, the spectral line has broadened with power being spread away from the center, which is caused by interception of multiple signal paths due to the multipath conditions around the intercepting device. The signature of the broadening is a function of the multipath environment: a more uniform and symmetric broadening indicates a very complex multipath environment and a sparse asymmetric broadening indicates a multipath environment with dominant zone of multipath reflections (e.g. a large flat metal object nearby). The amplitude in SNR is a measurement of the strength of multipath where the width measures the maximum observed Doppler shift. In a multipath free environment the maximum Doppler shift occurs when the device directly approaches the signal source or is moving directly away from the signal source. For signals moving obliquely relative to the signal source the Doppler shift will be less than the maximum shift; the Doppler shift will be zero when moving orthogonally relative to the signal source. In a complex multipath environment, the maximum observed Doppler shift is a measurement of the actual velocity and will be insensitive to direction.

Referring to graphs 503 and 504, the observed Doppler broadening for the case of 1.5 msec motion is about 42 Hz for the 1936 MHz signal and a width of about 19 Hz for the 869 MHz signal. To obtain the speed for the device given the Doppler broadening is accomplished by the following equation.

$$V = \frac{c}{4 f_{carrier}} \times \Delta f_{Width}.$$

$f_{carrier}$ is the carrier frequency, $\Delta f_{Width}$ is the width of the peak broadening, and c is the speed of light. Dividing by the factor of 4 accounts for the double sided broadening and the fact that the second harmonic is being observed. Applying this equation to the observed measurements shown in graphs 503 and 504 produces velocity magnitudes of 1.62 m/s and 1.72 m/s. Accounting for the 3 Hz peak, broadening due to Hanning windowing, which can bias velocity 10 cm/s and 25 cm/s, results in adjusted speeds of 1.52 m/s and 1.47 m/s for graphs 503 and 504 respectively. These values are in good agreement with an error estimate less than 5 cm/s.

The technique used to determine the peak broadening width for graphs 503 and 504 involves the determination of the average noise floor, lines 508 and 510, around the broadened peak and then set a threshold of 2.3 amplitude (about 7.2 dB Power SNR), lines 507 and 509. The threshold used for this example is determined by means of controlled experimental conditions using actual data. The threshold achieved minimum error over a range of SNRs. The simplicity of this technique allows for systematic calibration removing other biases and scaling errors since the technique has no explicit dependence on the local and signal source oscillator stability. Relative oscillator stability between the signal source and local oscillators affects measurement precision and minimum sensitivity. The practical minimum velocity sensitivity for the configuration chosen in this example is 11 cm/s for the 1936 MHz signal and 26 cm/s for the 869 MHz signal. Narrowing FFT bin width by increasing the length of the FFT time series can improve sensitivity for slow speed measurements. Wider FFT bin widths will be more effective for high-speed measurements providing more signal to noise ratio.

Alternative embodiments for determining velocity using Doppler Broadening are contemplated. These embodiments incorporate aspects of the broadened peaks' shape in addition to the width. These more complex methods can provide more accurate measurements and adapt to changes in the multipath environment.

Graphs 505 and 506 show an illustrative example of the Doppler Peak Shift technique that can be observed for signals in low multipath environments. Comparing Graph 505 with Graph 501, a device moving at 1.6 m/s would produce an 8.75 Hz frequency shift of the carrier second harmonic recovered as a result of delay and multiply operation, block 301. Unlike the Doppler Broadening technique, the SCP delay and multiply sensor is tuned to look at just the carrier second harmonic independent of the 270.33 kHz modulation clock. The change in frequency between graphs 501 and 505 represents the apparent Doppler shift for a device in motion at 1.5 m/s. Dividing the observed frequency by two and multiplying by the wavelength produces a Doppler velocity estimate of 1.5 m/s. Similarly the observed Doppler shift in Graph 506 is observed to be 19.5 Hz relative to the non-motion case in Graph 502 resulting in a velocity estimate of 1.50 m/s. For these observables in graphs 506 and 505 it was assumed that the device is directly towards the signal source producing maximum Doppler shift. Had the observables been negative then, the device would be moving away from the signal source. Observed frequencies less than the maximum observed Doppler shift corresponds to a signal source that do not lie along the path of motion. Zero frequency observed Doppler shift corresponds to a signal source that is orthogonal to the direction of travel.

Resolving the signal source direction vector relative to the path of motion requires a measurement of the actual speed of the device. In the preferred embodiment of the present invention, actual speed of the device can be accomplished in several ways, including: using the Doppler broadening technique for signals experiencing moderate multipath, calibrated values from the accelerometer data that will limit the maximum velocity in the first few seconds of motion, and repeatedly solving for the angle of the signal source over time using multiple observations.

The technique of determining the approximate angle of arrival for a signal using Doppler shift information requires that the direction of travel be monitored continuously such that multiple observations of a signal source can be related to each other over time. In the preferred embodiment of the present invention, compass data provides this function. The compass keeps track of the direction of travel in conjunction with both the Doppler velocity observables and accelerometer observables. The compass data are used to estimate the direction of a signal source in the fixed local coordinate system attached to the frame of the accelerometers. This technique can be extremely powerful in situations where multipath is unavailable to provide a randomizing effect such that only the Doppler shift technique is available and a priori knowledge of the RF signal vector is unknown.

The present invention further resolves local oscillator clock biases associated with the Doppler shift technique shown in graphs 505 and 506. The simplest way to resolve the local oscillator bias is to calibrate the oscillator bias at times when the device is either not in motion or where the velocity is known as a result of some other technique (e.g.

Doppler Broadening). Alternatively, the clock bias can be solved simultaneously when tracking multiple signals incorporating multiple observations over time. In this embodiment, at least one additional signal source is used to resolve clock terms; thus the minimum number of signals required to provide Doppler aiding to inertial sensors is two for the case of frequency peak shifting. By comparison, using the Doppler Broadening technique, as few as one signal source can provide useful velocity observables. In practice, at least two signals are desired: two signals sources provide usable data with good performance and minimize drop-outs. With only one signal source, there is the risk of outages due to Rayleigh fading and multipath interference, particularly in deep indoor environments where no direct signal is available.

Exemplary Implementation Test Results

Figure 6A:
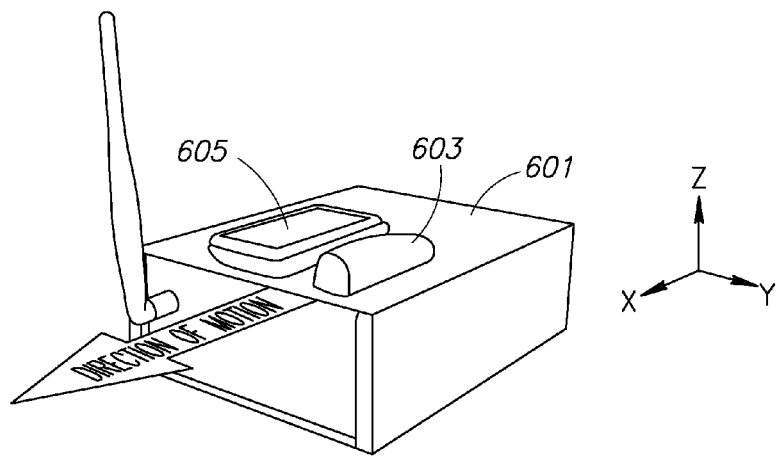
FIGS. 6A and 6B show an experimental apparatus and functional block diagram implementing one embodiment of the present invention.

To further teach the method and systematic concepts of the present invention, a simplified embodiment of the present invention is discussed and presented with actual test data. Using an SCP sensor, three-axis linear accelerator and an electromagnetic compass, the simplified implementation shows the performance of the present invention and the utility of combining Doppler RF observations with accelerometer data. The sensors used are shown in FIG. 6A, which comprise: 601 SCP Receiver Sensor (Loctronix Model 1000 RSU)—two channel software defined radio receiver implementing delay and multiply SCP technique; 603, GD Data Concepts X6-2-ST Micro Accelerometer LIS3L VO2DL, offset accuracy ±70 mg (0.68 m/sec$^2$); and 605 Motorola DROID with electromagnetic compass ±5 degrees drift indoors once calibrated. The positive X-Axis is oriented longitudinally along each device, where forward motion is registered as velocity in the positive X direction. Transverse (Y-Axis) and vertical (Z-Axis) motion data were ignored for this particular test.

Figure 6B:
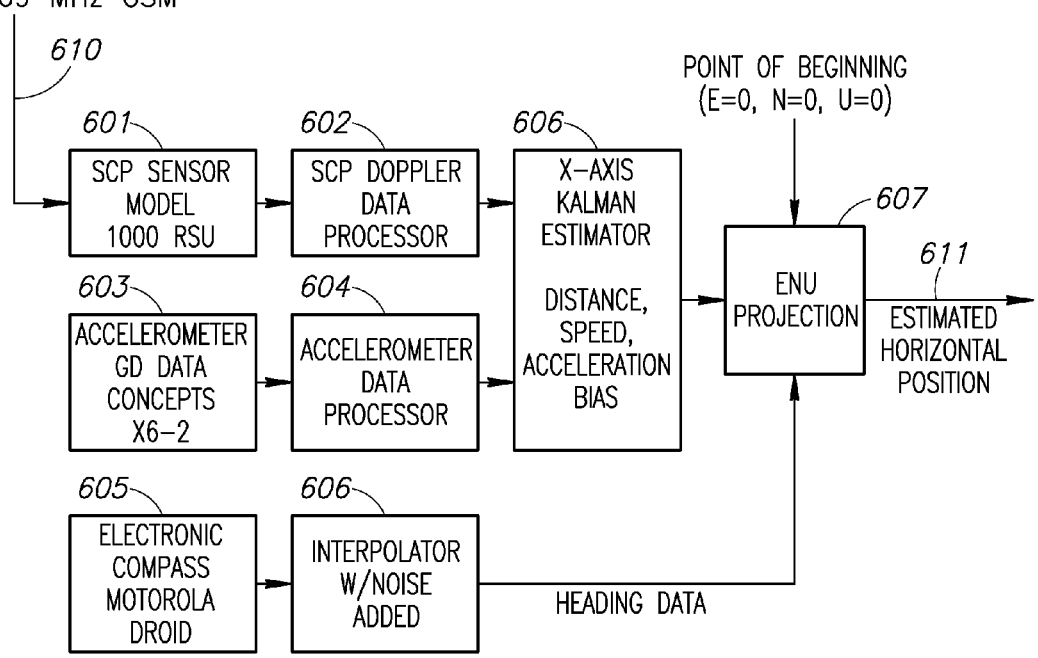

FIG. 6B shows the functional configuration of the sensors and processing software used to produce estimates of horizontal position. GSM signals at frequencies 869 and 1936 MHz, 610, are intercepted by the SCP sensor 601, which produces SCP baseband observables by tuning to the modulated region with a bandwidth of 270.833 kHz and second harmonic of carrier frequency. The spectral line is recovered using the in-phase (no quadrature) SCP delay and multiply technique with delay set to one microsecond. Block 602 uses the Doppler Broadening technique to produce speed estimates by averaging the observed Doppler velocity from both the 1936 and 869 MHz signals. The accelerometer 603 data is processed by block 604 to normalize and filter observables. In this example, the Motorola Droid 605 compass data is logged manually and interpolated by block 606 with random walk measurement noise added to ensure realism. The SCP Doppler speed data and accelerometer data are processed by block 606, which estimates the X-axis speed and acceleration sensor bias. The estimated speed data are transformed with the interpolated compass data using an ENU Projection 607 producing estimated horizontal position and velocity.

FIG. 6B is an alternative embodiment of the present invention, which serves to validate the performance capabilities in an indoor environment. A critical constraint of this particular embodiment is that the X-Axis must always be in the direction of motion; meaning that the direction of motions and the sensors are aligned throughout the test. In the preferred embodiment of the present invention, this constraint would be removed by incorporating processing of the Y and Z axis observables and rotational accelerations as discussed previously.

Figure 7A:
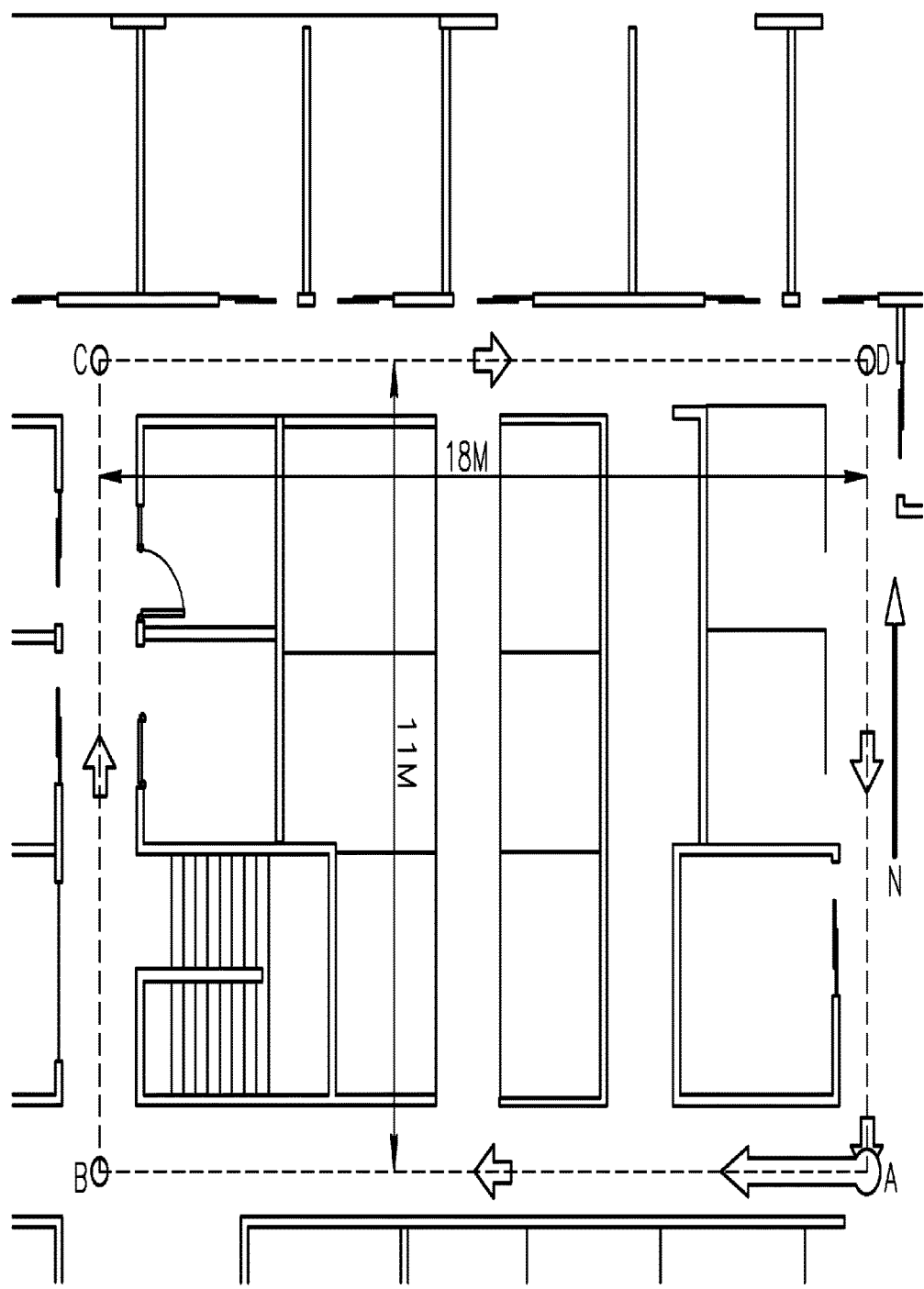

FIG. 7A shows the test environment used to evaluate one embodiment of the present invention's performance. The test environment is located inside a warehouse facility comprising steel reinforced concrete tilt up walls with a metal corrugated ceiling. The interior is configured into multiple office spaces constructed of gypsum board and metal studs. Testing GPS reception showed that it was unavailable in this space due to the metal roofing and deep interior location. Cellular reception was limited to reflected paths only, with no tower being directly visible. A test course was constructed around the perimeter of office cubicles denoted by the lines connecting points A, B, C, and D. FIG. 7B is a table providing the segment, bearing, distance, duration, start time, end time and average speed. The experiment was to have a person walk the course carrying the SCP sensor, accelerometer and compass, which was then processed by the methods of the present invention. The time and duration for each segment is noted and dividing the distance of each segment produces the average speed. FIG. 7B presents the truth data for the experiment and is used to assess the results of the techniques of the present invention. The course is aligned to be AB [270 deg (West)], BC [0 deg (North)], CD [90 deg (East)] and DA [180 deg (South)]. Between each of these segments, there is a 10 sec time interval of no forward motion but only a turning motion of 90.degree.

FIG. 7C shows the two GSM signals used to detect the Doppler broadening. The signals were both located to the southwest of the facility one at a distance of 945 m and the other at a distance of 2.8 km The signal denoted as GSM1 is at 1936 MHz with the strongest reception which is consistent with its shorter range.

GSM Doppler Broadening Observables

Figure 8A:
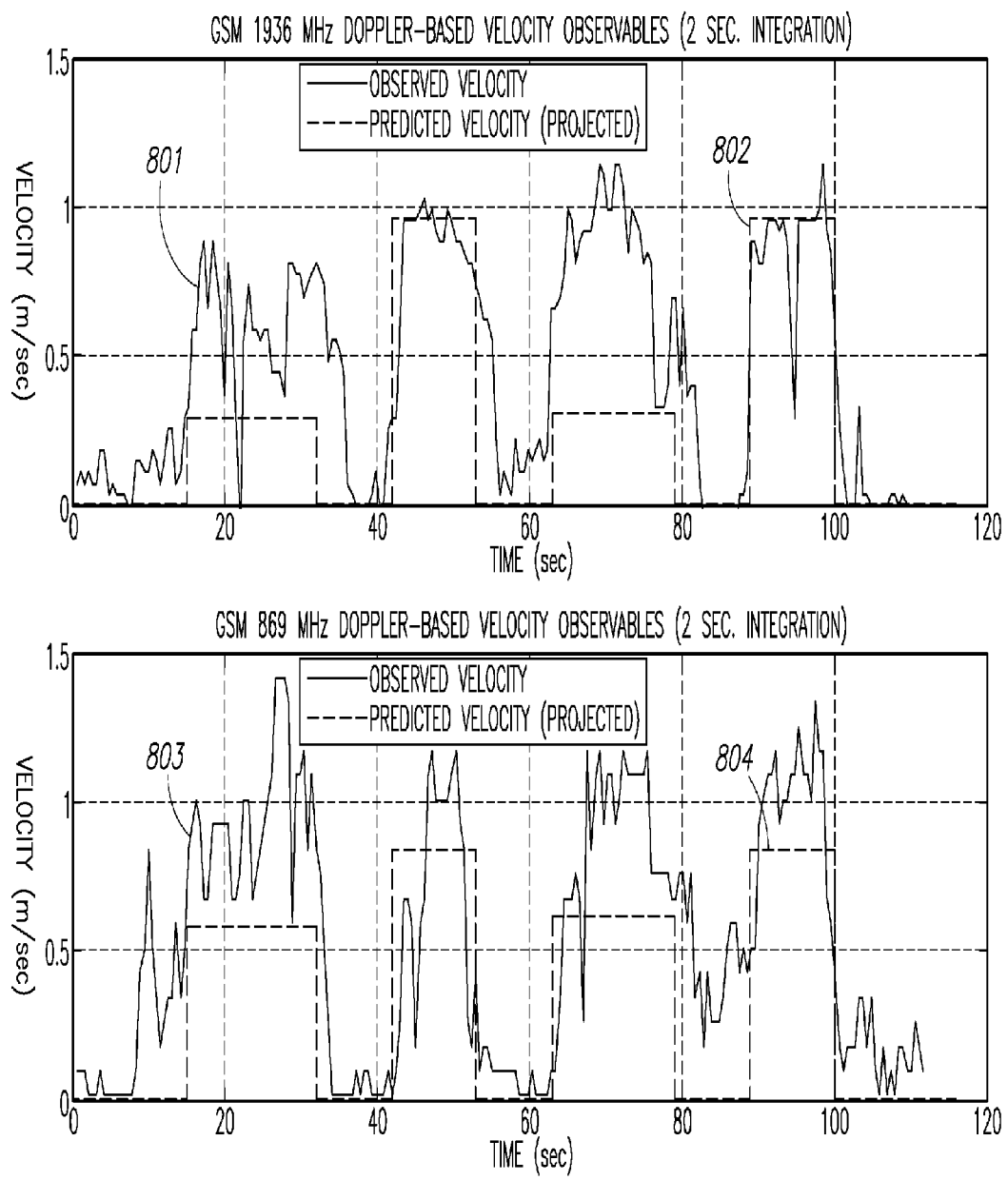
FIG. 8A shows the observed velocity data as measured using the Doppler Broadening technique for two GSM signals as well as comparing it to the predicted Doppler peak shift values under minimal multipath conditions.

FIG. 8A shows the Doppler broadening velocity determined from the GSM signal observables. The observable velocities 801 and 803 are shown relative to the predicted velocity observables that were based on the frequency shift technique using the projection onto the line of propagation given the direction azimuth specified in FIG. 7C. The resulting detected velocities did not match the predicted values, which is consistent with underlying principles that produce the Doppler broadening. Comparison of 801 with predicted values 802 results in visible correlation between the bearing of the signal source and the observed speed. The segments starting at times 15 and 60 seconds were when the signal source would have produced the least amount of Doppler shift compared to the maximum Doppler shift starting at times 42 and 64 seconds Observed velocities 801 and 803 demonstrated that the observed velocity closely matched the total velocity magnitude as opposed to the projection onto the lines of sight. The reason to compare the Doppler broadening data with expected peak shift observables is to confirm that multipath and Rayleigh fading interference in indoor environment obscure the directional information that might otherwise be used in more traditional Doppler observable techniques. This directionless quality of Doppler broadening makes it an attractive data type to use in fusion with accelerometer data.

Figure 8B:
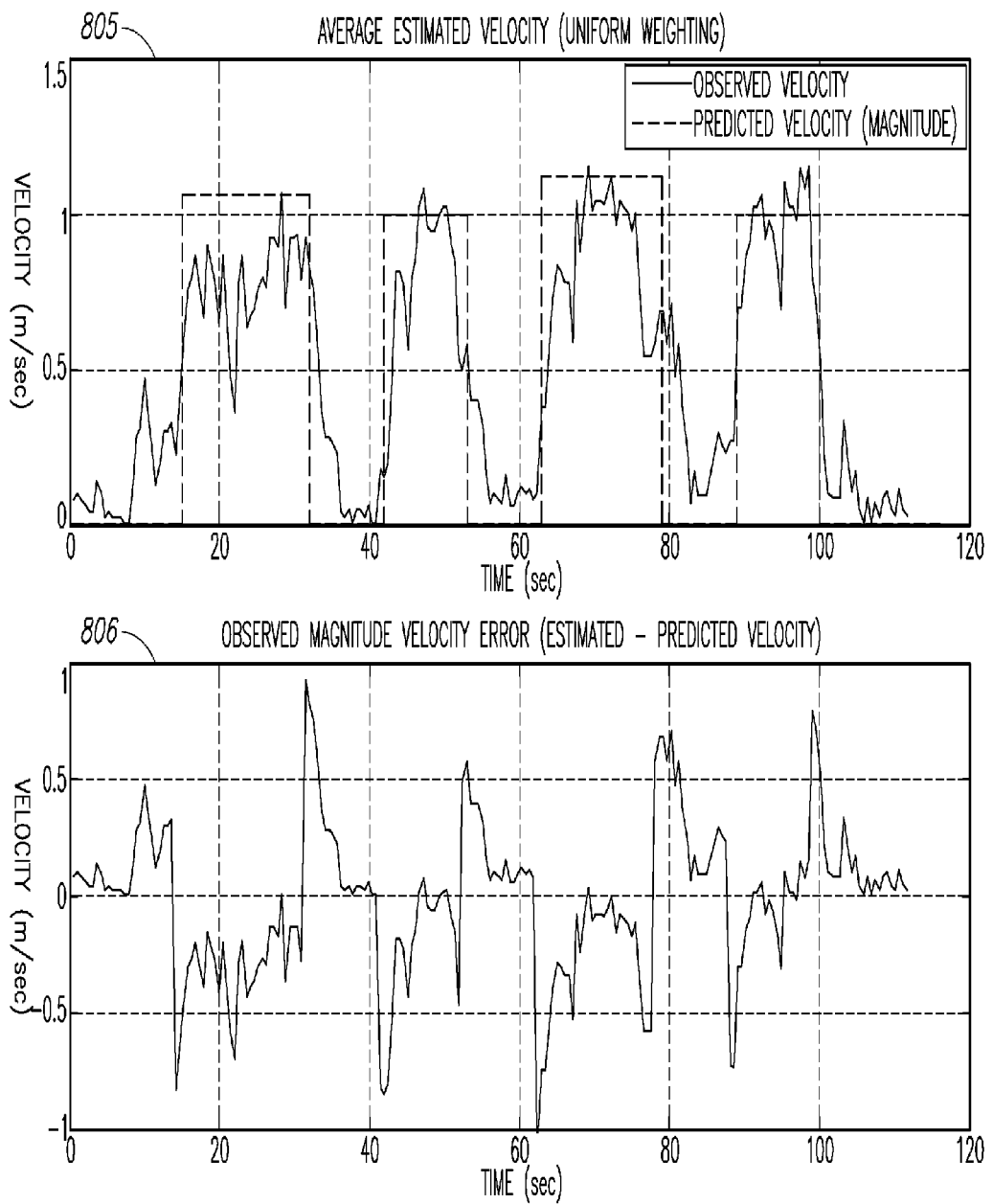
FIG. 8B shows the average estimated velocity data combining the two observed GSM signals using uniform weighting and comparing the results to the truth data with an error of less than 0.1 msec.

FIG. 8B shows the average estimated velocity fusing uniform weighting given the two GSM signals observed. This is compared to the predicted velocity magnitude based upon the truth data in FIG. 7B. Plot 805 shows the observed and predicted values overlaid and plot 806 shows the actual observed error of the velocity negative measurements by subtracting the predicted values from the actual observed.

With the exception of the times when the sensor was transitioning from an in motion to no motion state, there was fairly good agreement and observed velocities were within 15 cm/s in most cases.

Accelerometer Data

Figure 9A:
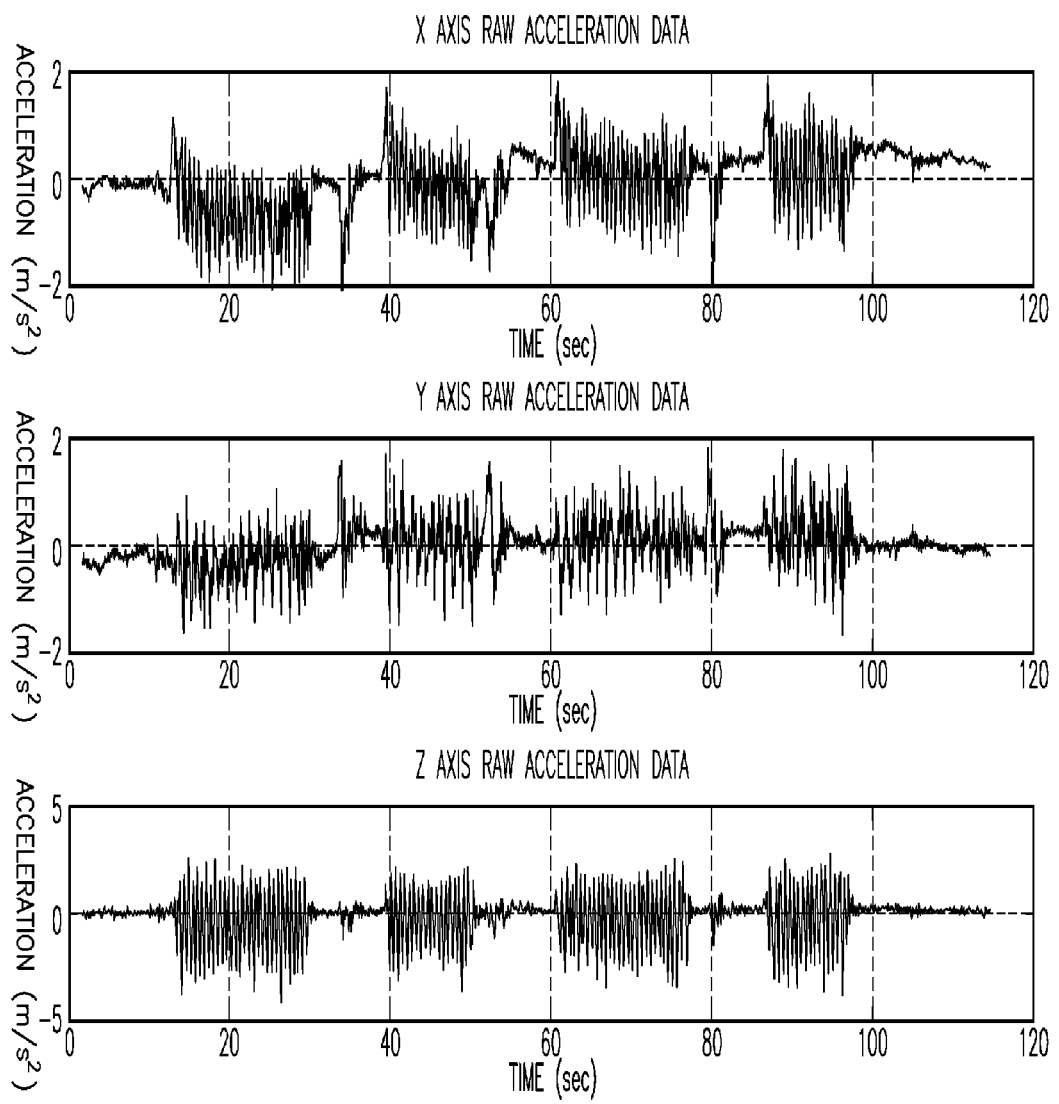
FIG. 9A shows the raw acceleration data collected from a three axis accelerometer.

FIG. 9A shows the raw acceleration data recorded for the X, Y, and Z axis. The accelerometer was operated in high resolution mode (maximum range ±19.6 m/sec$^2$) at a 20 Hz rate. In its raw form, the data lacked sensitivity to forward velocity. Significant acceleration biases exist, which if integrated would result in highly erroneous results. Referring to the performance specifications for ST Micro LIS3L accelerometer, the stated maximum drifts for X and Y axes are ±0.68 m/sec$^2$, and the device was operating within expected limits. Extracting useful velocity information from the acceleration data requires calibrating the device and removing the gross acceleration biases.

Figure 9B:
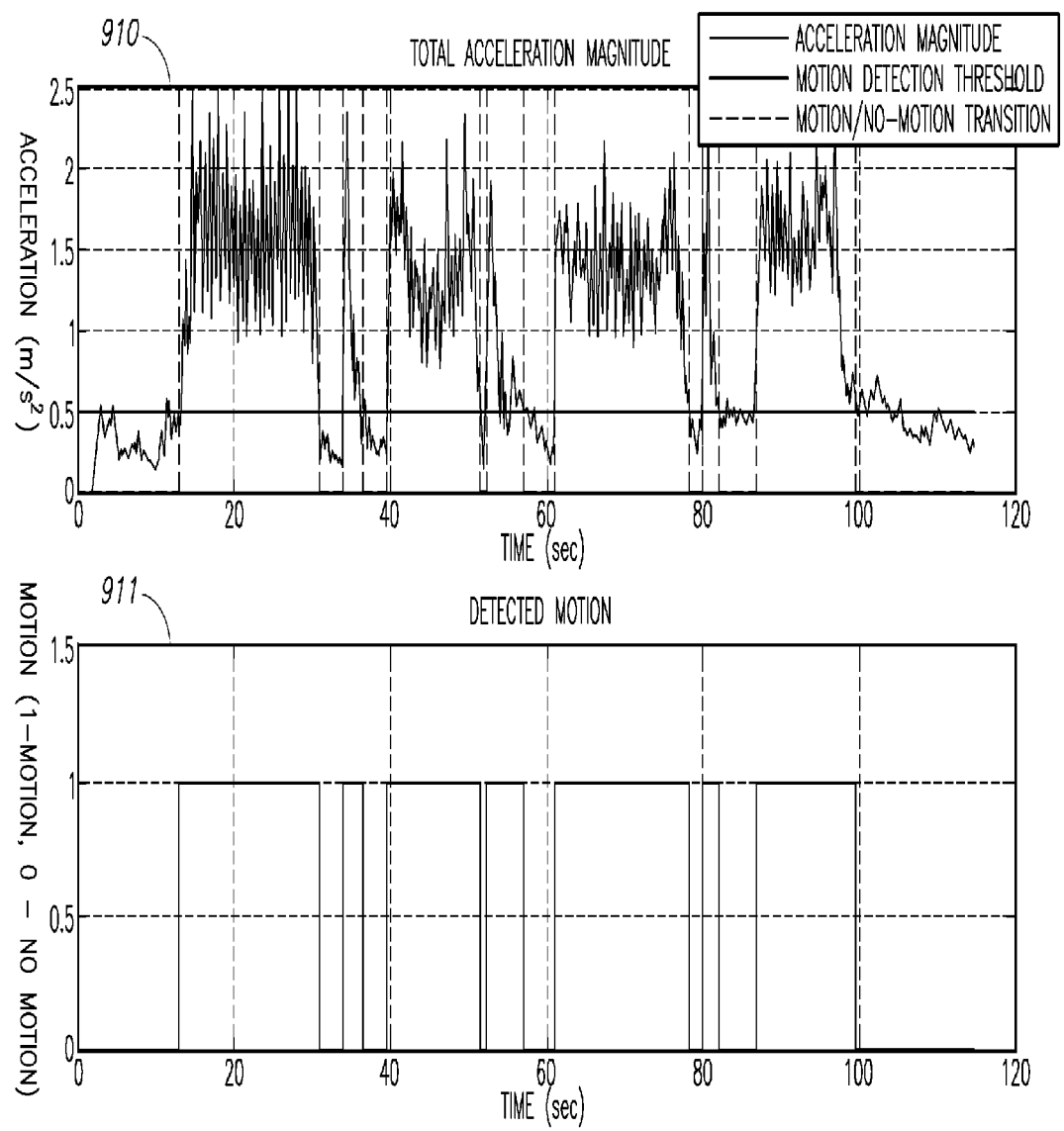
FIG. 9B shows the detection of motion and no motion transitions using and acceleration threshold of 0.5 m/sec2.

From examination of these data it was readily apparent when the person was in motion and stopped. First order calibration accelerometer preprocessing zeroed out accelerometer biases when the device was detected to be stationary. During motion, the accelerometer data showed an oscillatory behavior where the frequency is a function of the walking stride period. Examining the absolute accelerometer data magnitude, all three axes combined showed a strong signature when the person is in motion and stopped. As shown in FIG. 9B, if a threshold of 0.5 m/sec.sup.2 is applied with two second time constant, the motion to no-motion change of state conditions are readily identified.

Plot 910 shows the motion/no motion detection threshold overlaid on top of the acceleration magnitude from all three sensors. Additionally, the transition epochs are noted by the dashed line. Plot 911 shows the resulting detected motion no motion signature, where a value of one means in motion, and a value of zero reflects no motion.

Comparing plot 911 with the truth data in FIG. 7B confirms the detection method to be accurate within the expected measurement precision. Plots 910 and 911 also showed the accelerations when the person turned 90° at times 35, 52 and 81 seconds. Perfect alignment with the truth data was not expected because the timing of walking events were approximate having been recorded manually using a stopwatch.

Figure 9C:
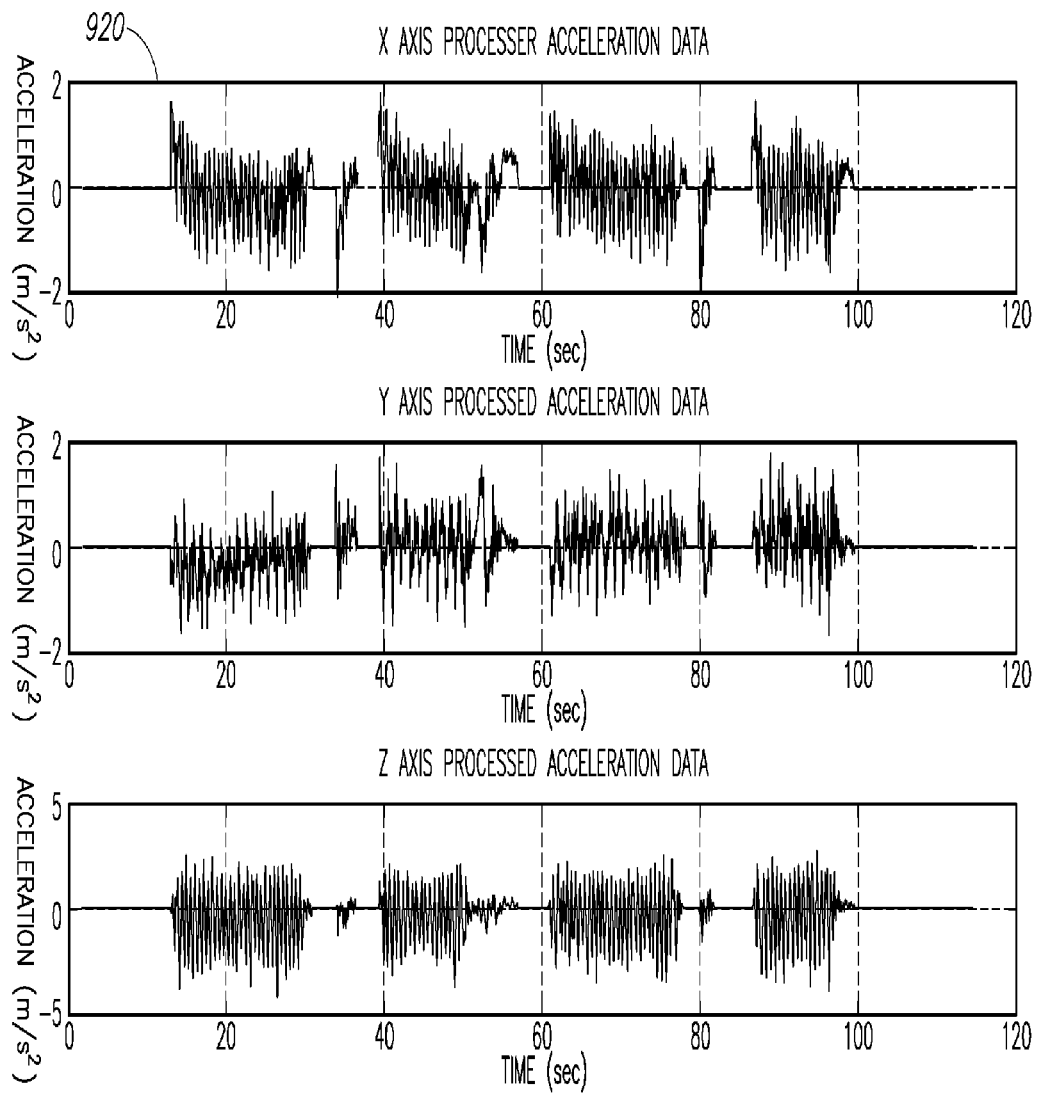
FIG. 9C shows the processed three axes acceleration data after removing the biases and zeroing the accelerations when the device was not in motion. These data are the best estimate of acceleration prior to processing by a Kalman filter combining the Doppler observables.

Given the motion/no motion signature shown in plot 911 and resetting of the bias while not in motion, a high-pass filter (cutoff frequency=0.2 Hz) was used to filter the acceleration data during motion to remove the acceleration bias as shown in FIG. 9C. Comparing this with the raw acceleration data in FIG. 9A, the constant biases have been removed and the acceleration is at zero when not in motion. Examining the X-Axis data in plot 920, aligned with the forward motion, the start and stop accelerations are more evident than in the raw data. At the beginning of forward motion there is a larger positive acceleration and at the end of forward motion there is more negative acceleration. While the devices were carried by hand away from the body, the periodic accelerations due to walking are still the dominant structure in the data. In the X-Axis data, there remains evidence of sensor acceleration bias and acceleration bias rate. Integrating the data in FIG. 9C obtains the velocity. The effects of acceleration bias and bias rate can be seen in FIG. 10.

Figure 10:
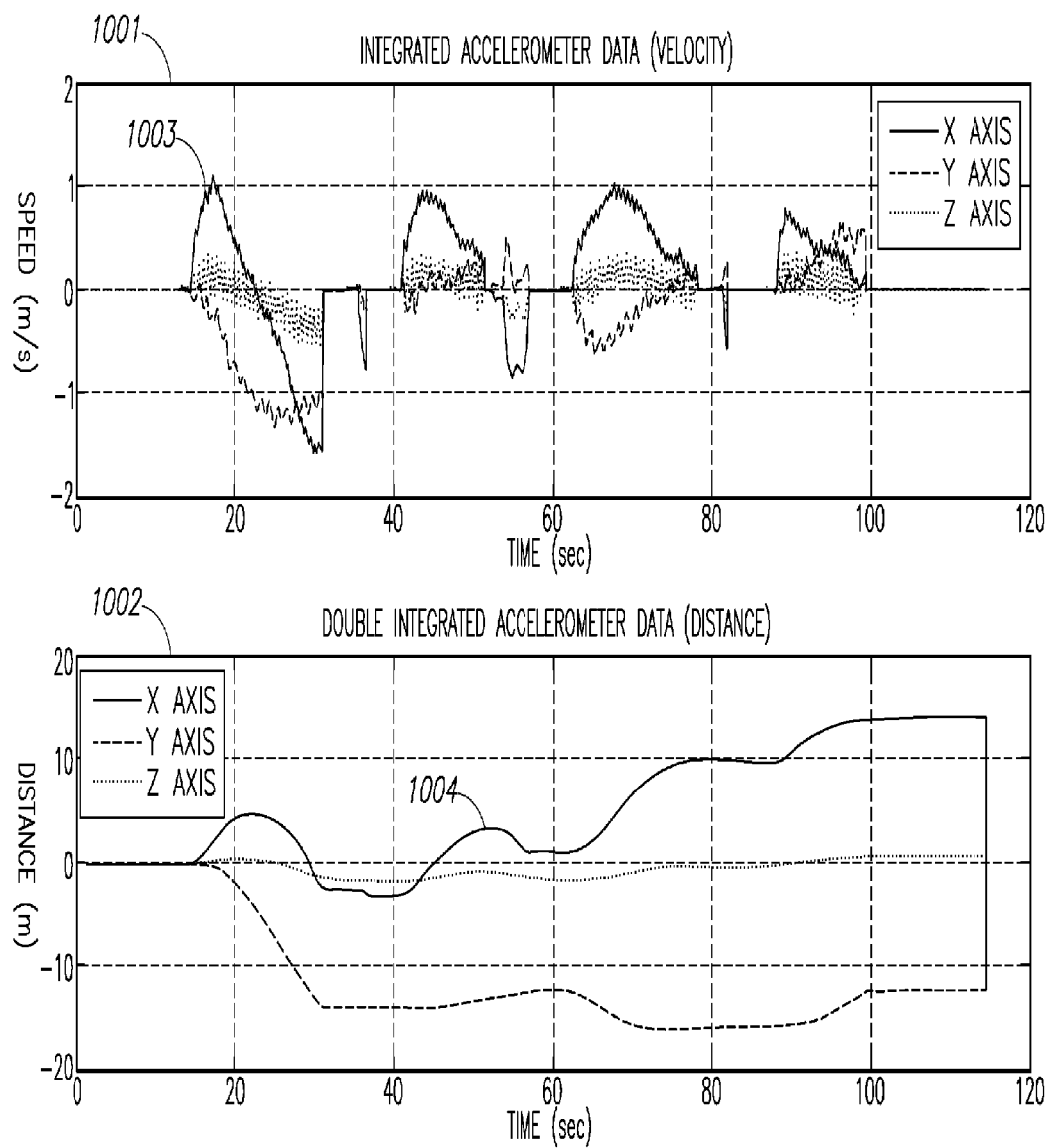
FIG. 10 shows the integrated acceleration (velocity) and double integrated acceleration (distance) using the filtered acceleration data. Results show that without further calibration these values do not track well with actual truth. The accelerometer drift makes the integrated values useless within a few seconds.

FIG. 10 shows the integrated velocity, plot 1001, and double-integrated distance, plot 1002, using the processed accelerometer data. The X-Axis data 1003 shows forward velocity, but also shows the rapid growth in error over time as acceleration biases dominate. Integrating for the second time, the forward motion 1004 displacement estimates (X-Axis) correspond well in the first few seconds, but become highly inaccurate beyond 20 seconds. If the accelerometer had been more accurate and free of the biases, the resulting integrated distance would look more like FIG. 13. Over 86 seconds of total forward motion the integrated forward motion was in error by 44 meters. Given the 58 meters traversed during the test, this is more than a 75% error. This result is typical of commodity grade accelerometers and it demonstrates the need for an external calibration enabled by the present invention.

Electronic Compass Data

A Motorola Droid smart phone was used to collect magnetic compass heading reading. It was understood that the phone used the Asahi Kasei 3-axis electronic compass, AK8973. Within the office-warehouse type construction (cement tilt-up, metal studs, wooden flooring), this device appeared to perform relatively well once the compass is calibrated in accordance with the product directions Taking measurements during the walk around test, a variance of ±5 degrees was noted, with good repeatability between tests. Walking past ferromagnetic objects caused the azimuth readings to deviate, but it returned to the nominal heading within a second or two.

Figure 11:
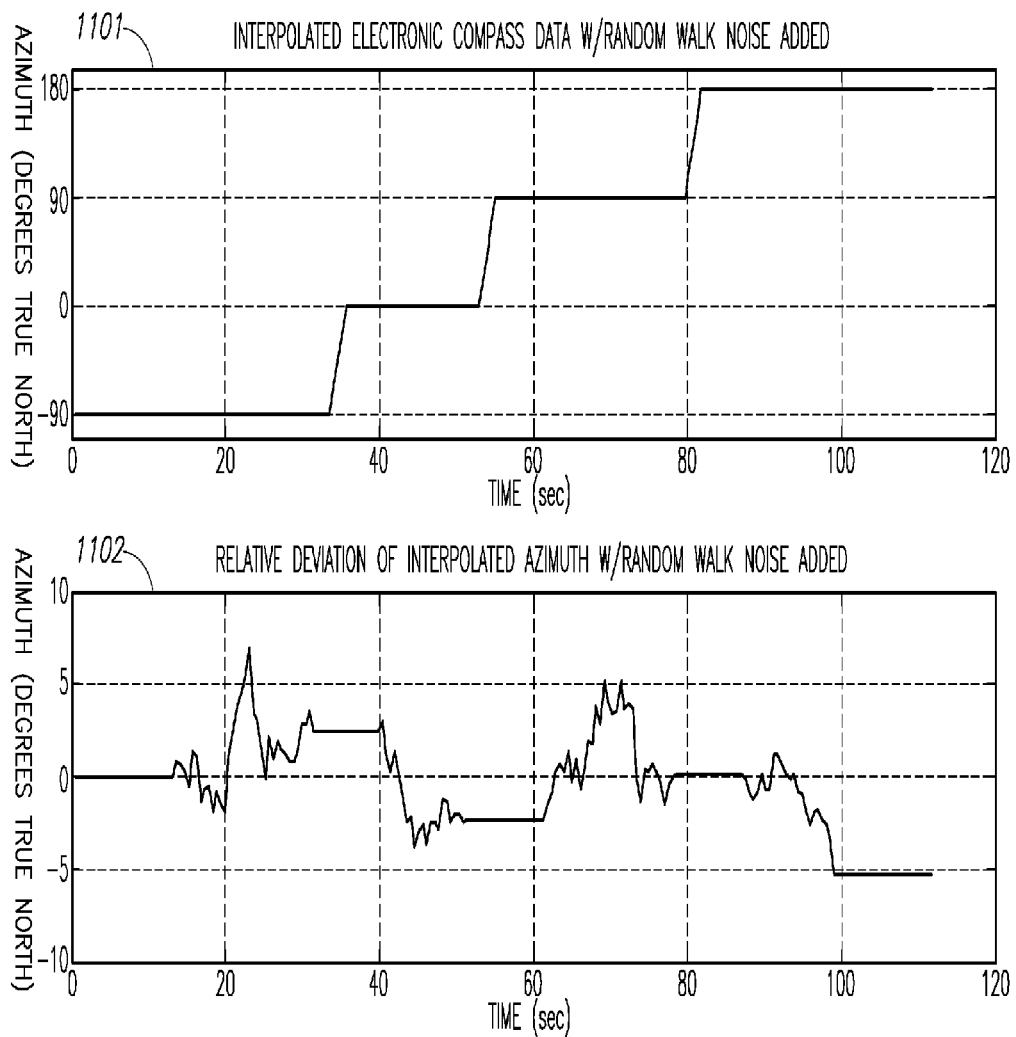
FIG. 11 shows the interpolated electronic compass data collected during the experiment with random walk noise added during the interpolation step to impose more realistic conditions.

Data was collected manually by recording the heading data at the stopping points and several times along each segment. This data was used to generate the azimuth data shown in FIG. 11. The plot 1101 shows the azimuth values recorded and adjusted to relative to true North. Plot 1102 shows the random walk noise and offsets relative to the true path added during interpolation. The noise was added to increase the "realism" of the data during the interpolation. Had an automated method for data collection been used, the variance noted previously would have been expected. Thus, the random walk noise created a reasonable approximation.

Sensor Fusion Processing

To combine the Doppler and the integrated accelerometer velocities, a three-state Kalman estimator was applied and tuned to take advantage of Doppler's long-term accuracy and the accelerometer's short-term high-resolution and only short term stability. A simple model relating estimates of x-axis displacement (x) and speed ($\dot{x}$) to the observed Doppler ($v_{Doppler}$) and inertial ($v_{inertial}$) velocity is shown below:

$$x = \int \dot{x}\, dt$$

$$\dot{x} = v_{Doppler}$$

$$\dot{x} + a_{Bias} \cdot (t - t_0) = v_{inertial}$$

A time varying acceleration bias, $a_{bias}$, is added to account for the X-axis accelerometer drift. From these equations the discrete, linear state-space representation is formulated as follows:

$$x(t_k) = Ax(t_k); \quad \text{state propagation equation}$$

$$y(t_k) = Cx(t_k); \quad \text{measurement equation}$$

Where, $$x = \begin{bmatrix} x \\ \dot{x} \\ a_{bias} \end{bmatrix}$$

$$y = \begin{bmatrix} v_{Doppler} \\ v_{Inertial} \end{bmatrix}$$

-continued $$A = \begin{bmatrix} 1 & t_{k+1} - t_k & 0 \\ 0 & 1 & 0 \\ 0 & 0 & 1 \end{bmatrix}; \text{State Transition Matrix}$$

$$C = \begin{bmatrix} 0 & 1 & 0 \\ 0 & 1 & t_k - t_o \end{bmatrix}; \text{State - Observation Mapping Matrix}$$

The relatively simple model was chosen to validate the methods of the present invention since it allowed for manual tuning of the a priori covariance, observation weighting and process noise parameters. For this test, processing was limited to the primary direction of motion, the X-axis. The model for preferred embodiment of the present invention would be more sophisticated incorporating multiple dimensions, rotational acceleration data, and additional parameters to model biases and other systematic errors.

Figure 12A:
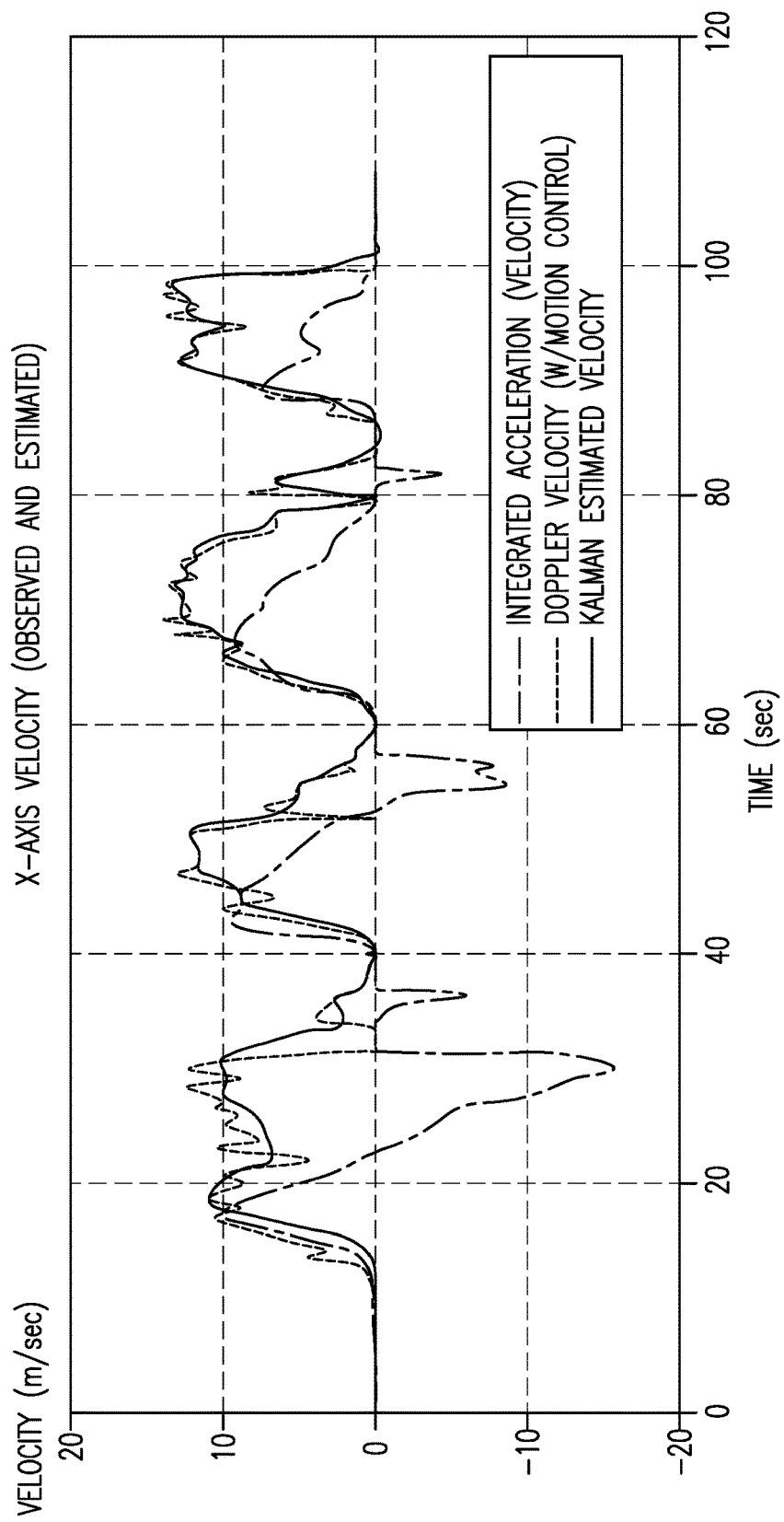
FIG. 12A shows the Kalman estimated x-axis velocity based on both accelerometer and Doppler broadening observables overlaid with velocity by Doppler integrated accelerometer velocity and Doppler observables.
Figure 12B:
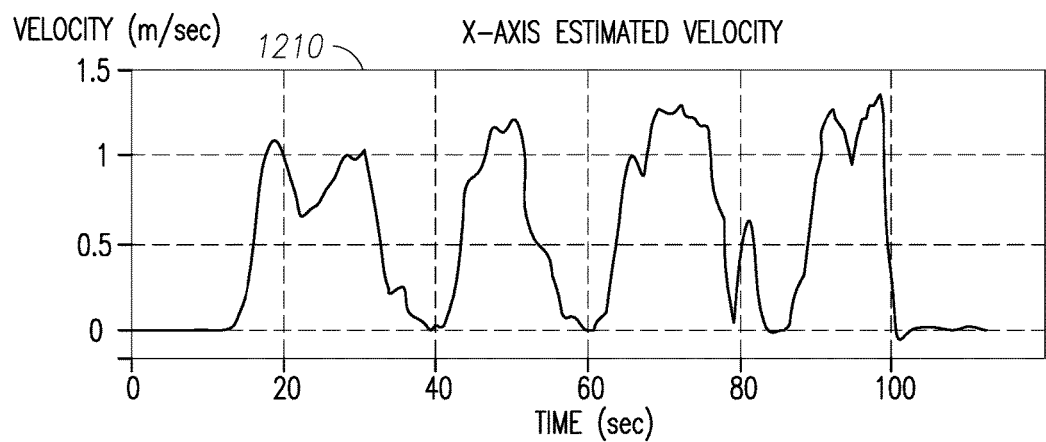
FIG. 12B shows the state vector for the Kalman filter at each epoch during processing with post-fit residuals shown as well.
Figure 12B:
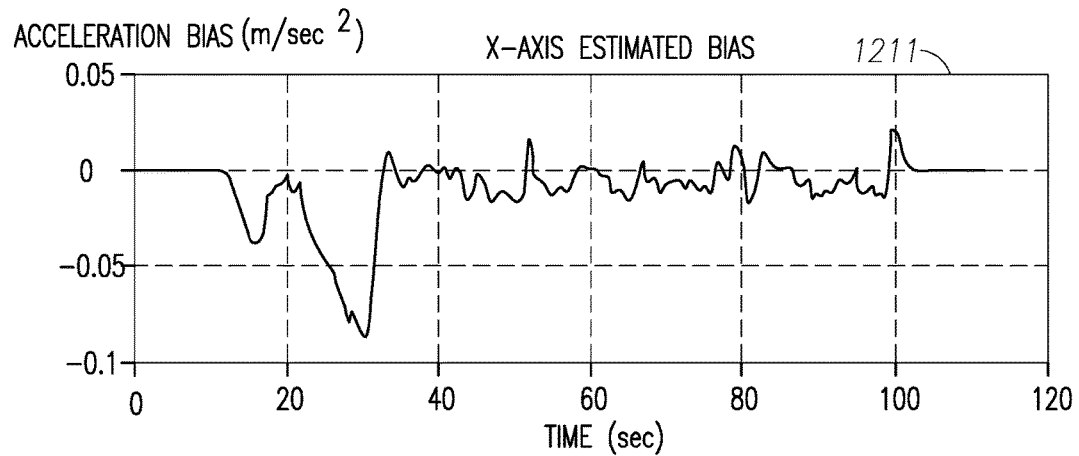
Figure 12B:
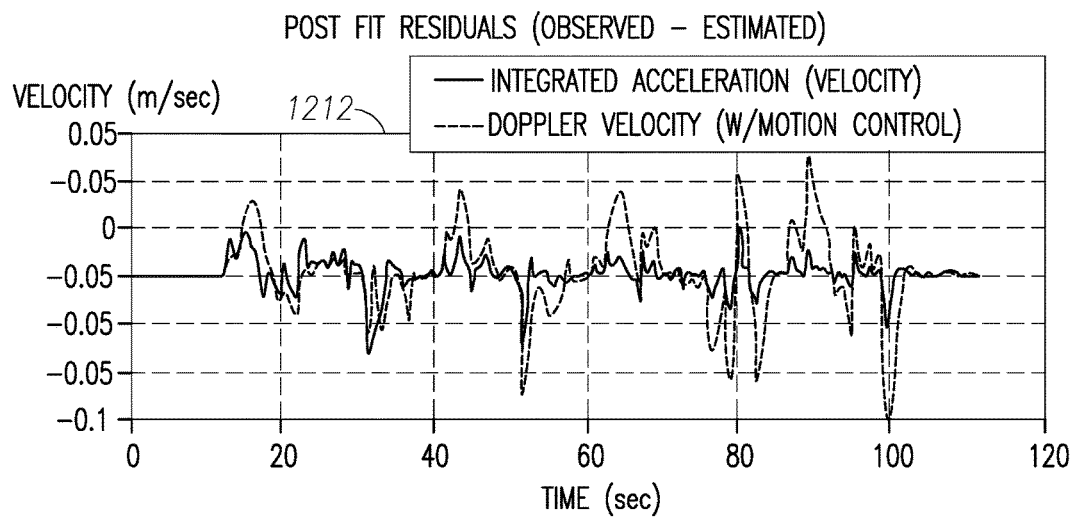

FIG. 12A, shows the X-axis estimated speed ($\dot{x}$) overlaid onto the processed Doppler and integrated accelerometer velocities. The estimate follows closely the Doppler velocity observables. The integrated accelerometer velocity observables and estimator tuning smoothed the estimates and reduced the effects of signal drop-outs at times t=22 and t=67 seconds. FIG. 12B shows the estimated velocity 1210 ($\dot{x}$), acceleration bias 1211 ($a_{bias}$) and post-fit residuals 1212 output from the Kalman filter. Post fit residuals had a combined RMS error of 0.34 msec and a closure back to the starting point within 1.5 meters.

Figure 13:
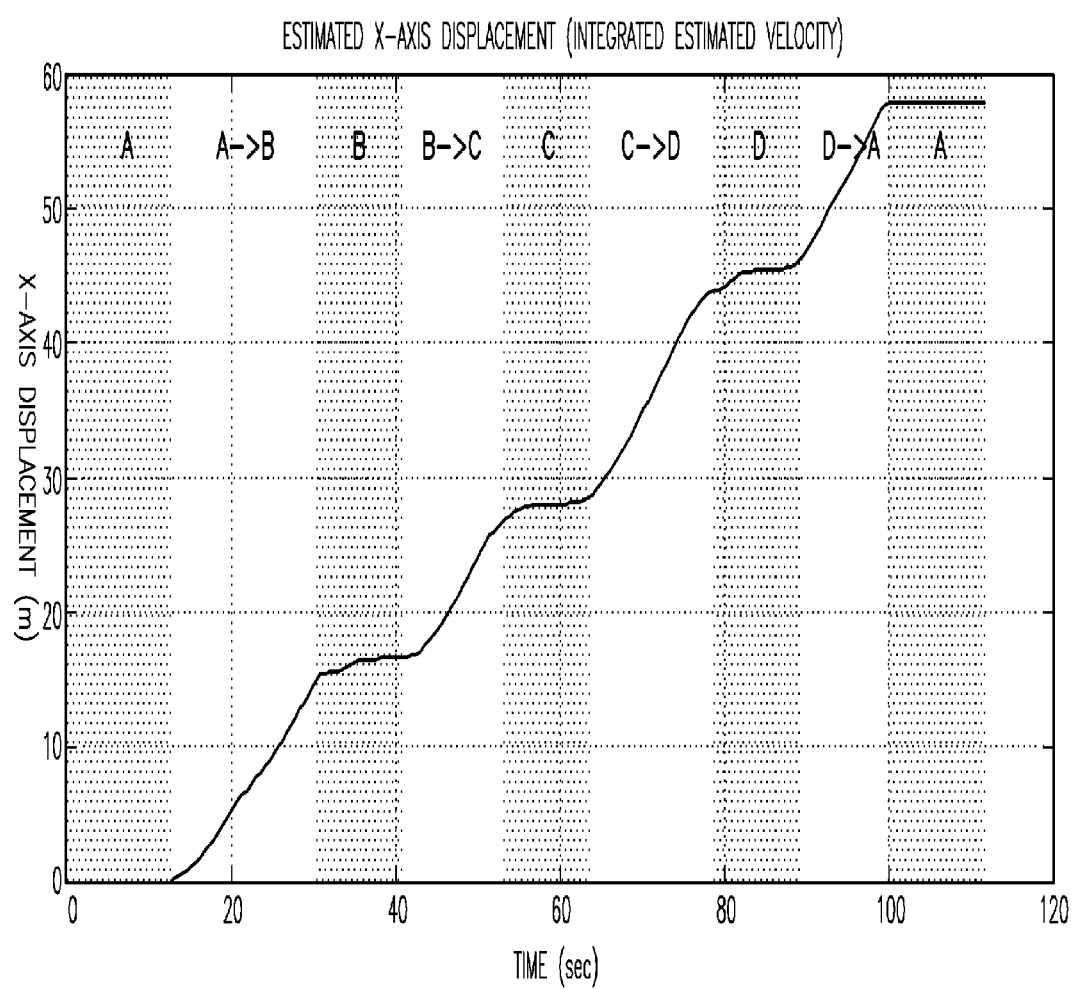
FIG. 13 shows the estimated X-axis displacement using the Kalman filter estimated velocity.
Figure 14:
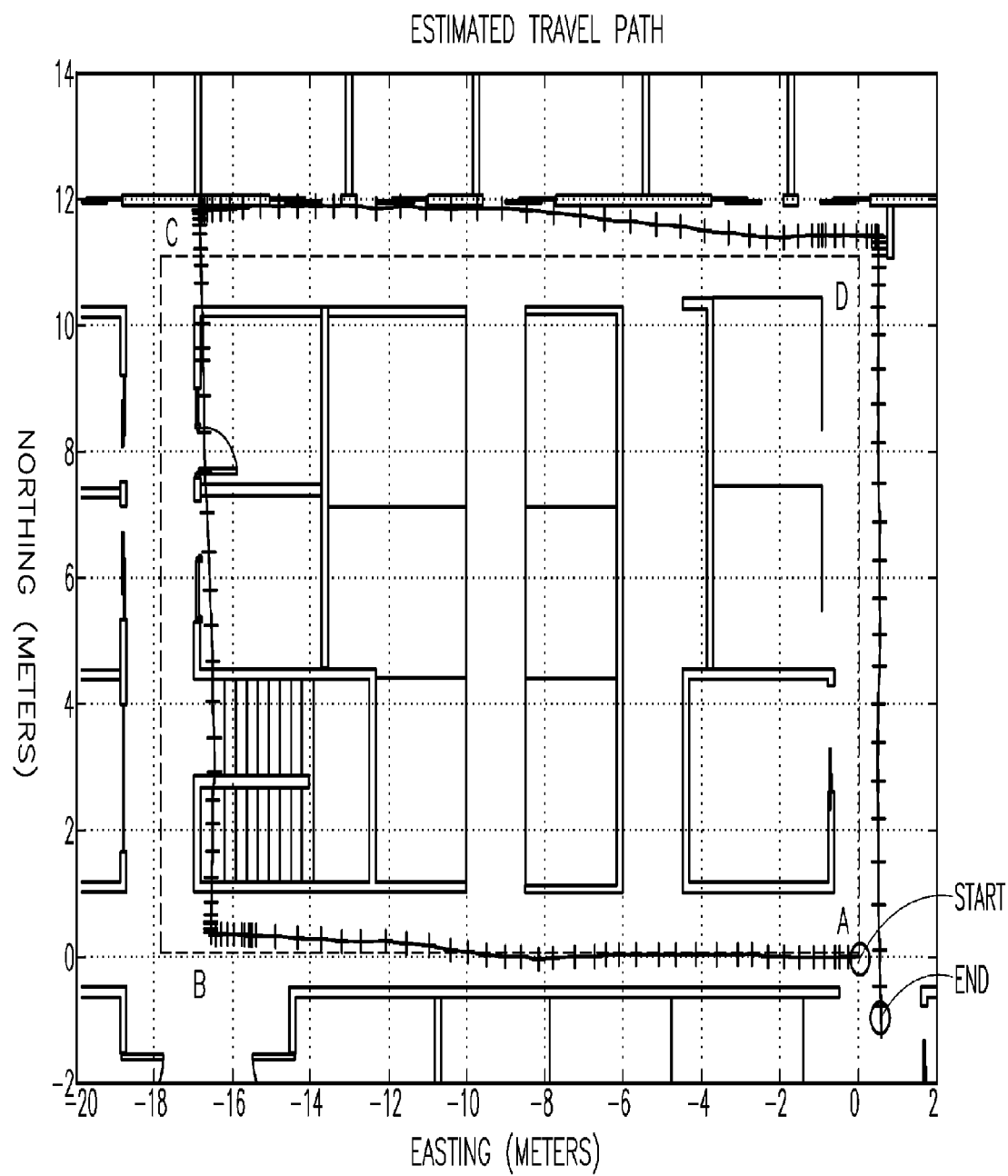
FIG. 14 shows the estimated travel path for the test by projecting the X-axis velocities onto a local East North Up (ENU) reference frame given the observed compass values for heading during the test.

FIG. 13 shows the estimated X axis displacement as a function of time given the velocity estimates 1210 produced by the Kalman filter shown in FIG. 12B. The total displacement is 57.5 meters from start to finish. This is nearly the actual course displacement of 58 m. However, when the compass data is applied to project the X-axis displacement onto an East-North-Up (ENU) coordinate system, it is evident that there are some significant differences between the estimated and true travel paths as shown in FIG. 14.

The estimated travel path is short by approximately 1.5 meters on the first leg, A→B, long from B→C, short from C→D, and long again from D→A. It is expected that better processing of the Doppler data using a weighted average based on received signal-to-noise (SNR) will reduce some of these errors. The technique remained within 1.25 meters CEP of the true course at each point in the test. This equates to an average error of 2.2%. It is expected that adding additional signal sources and improving processing algorithms will achieve an average performance of less than 2%.

The results of the testing of various embodiments confirm the operational viability and advantages of the present invention. The fusion of Doppler observables data together with accelerometer information is accomplished without a priori knowledge of signal source locations and provides very low drift error over distance. It is expected that further testing with the preferred and alternative embodiments of the present invention will result in improved performance due to mitigations of both systematic and environmental error sources visible in these initial implementations.

While the preferred embodiment of the invention has been illustrated and described, as noted above, many changes can be made without departing from the spirit and scope of the invention. Accordingly, the scope of the invention is not limited by the disclosure of the preferred embodiment.

What is claimed is:

1. A mobile computing device comprising:
   a receiver that transforms two or fewer intercepted radio frequency emissions external to the mobile computing device into Doppler frequency observables;
   a plurality of inertial sensors, each sensor having a linear accelerometer that produces acceleration observables;
   a spectral compression positioning sensor that performs spectral compression utilizing a non-linear operation on the Doppler frequency observables to produce a set of Doppler frequency observables in a format for physical state estimation by the physical state estimator; and
   a physical state estimator that:
      processes the set of Doppler frequency observables and the acceleration observables to determine a member of a physical state of the mobile computing device;
      converts Doppler frequency observables to speed; and
      corrects inertial drift error of the plurality of inertial sensors based on the speed.

2. The mobile computing device of claim 1, wherein the set of observables includes a physical characteristic of the two or less intercepted radio frequency emissions including at least one of an amplitude, a phase and a temporal derivative.

3. The mobile computing device of claim 1, wherein the plurality of inertial sensors have a rotational accelerometer that produces angular acceleration observables.

4. The mobile computing device of claim 1, further comprising an environmental sensor that provides information related to the environment in which the mobile computing device is located, wherein the environmental sensor includes one of a magnetic compass or a barometric pressure sensor.

5. The mobile computing device of claim 1, further comprising a positioning sensor that provides information related to the location of the mobile computing device.

6. The mobile computing device of claim 1, further comprising:
   a map cache that provides map information relative to a current physical location of the mobile computing device; and
   a map matching component that compares the map information to the member of the physical state of the mobile computing device, wherein the physical state estimator updates the member of the physical state of the mobile computing device based on the comparison.

7. The mobile computing device of claim 1, wherein the mobile computing device is carried on a person and the physical state estimator estimates the step-size and step-rate of the person based on the Doppler frequency observables and acceleration observables.

8. The mobile computing device of claim 7, wherein the physical state estimator updates the member of the physical state of the mobile computing device based on the step-size and step-rate.

9. The mobile computing device of claim 1, wherein the two or fewer intercepted radio frequency emissions external to the mobile computing device are propagated from a terrestrial source.

10. The mobile computing device of claim 1, the plurality of inertial sensors further comprising a rotational accelerometer that provides rotational acceleration observables associated with the mobile computing device, wherein systematic biases within the rotational acceleration observables are removed using Doppler data over time intervals exceeding a few seconds.

11. A method comprising:

intercepting, at a RF Doppler Receiver, two or fewer radio frequency emissions external to a mobile computing device;

transforming, at a spectral compression positioning sensor, by spectral compression utilizing a non-linear operation, the Doppler frequency observables from the two or fewer intercepted radio frequency emissions into a set of Doppler frequency observables for physical state estimation;

receiving, at a physical state estimator, acceleration observables from a linear accelerometer from a plurality of inertial sensors associated with the mobile computing device;

processing, at the physical state estimator, the set of Doppler frequency observables and received acceleration observables to determine a member of a physical state of the mobile computing device;

determining, at a narrowband signal detector, speed of the mobile computing device from the Doppler frequency observables; and correcting, at the physical state estimator, inertial drift error based on the speed.

12. The method of claim 11, further comprising:

producing, by the spectral compression positioning sensor, physical characteristics of each observable of the set of Doppler frequency observables in the form of amplitude, phase and temporal derivatives of the two or less intercepted radio frequency emissions.

13. The method of claim 11, further comprising:

receiving, at the physical state estimator, acceleration observables from a rotational accelerometer associated with the mobile computing device.

14. The method of claim 11, further comprising:

receiving, at the physical state estimator, information related to the environment in which the mobile computing device is located from an environmental sensor; and processing, at the physical state estimator, the received information related to the environment to determine another member of the physical state of the mobile computing device.

15. The method of claim 11, further comprising:

receiving, at the physical state estimator, information related to the location of the mobile computing device from a positioning sensor associated with the mobile computing device; and processing, at the physical state estimator, the received information related to the location of the mobile computing device to determine another member of the physical state of the mobile computing device.

16. The method of claim 11, further comprising:

comparing, at a map matching module, the member of the physical state of the mobile computing device with map information relative to a current physical location of the mobile computing device from a map cache; and updating, at the physical state estimator, information associated with the member of the physical state of the mobile computing device.

17. The method of claim 11, further comprising:

estimating, at the physical state estimator, the step-size and step-rate of a person carrying the mobile computing device based on the Doppler frequency observables and acceleration observables; and updating, at the physical state estimator, the member of the physical state of the mobile computing device based on the estimated step-size and step-rate.

\* \* \* \* \*